United States Patent
Balasubramanian et al.

(10) Patent No.: US 11,937,277 B2
(45) Date of Patent: Mar. 19, 2024

(54) CONCURRENT SIDELINK AND UPLINK TRANSMISSION

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/121,321

(22) Filed: Dec. 14, 2020

(65) Prior Publication Data

US 2021/0195576 A1 Jun. 24, 2021

Related U.S. Application Data

(60) Provisional application No. 62/951,928, filed on Dec. 20, 2019.

(51) Int. Cl.
*H04W 72/51* (2023.01)
*H04W 52/34* (2009.01)
(Continued)

(52) U.S. Cl.
CPC .......... *H04W 72/51* (2023.01); *H04W 52/34* (2013.01); *H04W 72/1268* (2013.01); *H04W 72/21* (2023.01); *H04W 72/542* (2023.01)

(58) Field of Classification Search
None
See application file for complete search history.

(56) References Cited

U.S. PATENT DOCUMENTS

2018/0049193 A1* 2/2018 Belleschi .......... H04W 72/0446
2018/0139769 A1* 5/2018 Lee .................. H04L 5/0094
(Continued)

OTHER PUBLICATIONS

Ericsson: "Power Budget Sharing Across SL and UL," 3GPP Draft, 3GPP TSG RAN WG2 Meeting #97, R2-1703544—Power Budget Sharing Across SL and UL, 3rd Generation Partnership Project (3GPP), Mobile Competence Centre, 650, Route Des Lucioles, F-06921, Sophia-Antipolis Cedex, France, vol. RAN WG2, No. Spokane, Wa, USA; Apr. 3, 2017-Apr. 7, 2017, Apr. 3, 2017 (Apr. 3, 2017), XP051245385, 2 pages, Retrieved from the Internet: URL: http://www.3gpp.org/ftp/Meetings_3GPP_SYNC/RAN2/Docs/ [retrieved on Apr. 3, 2017] the whole document.
(Continued)

*Primary Examiner* — Kodzovi Acolatse
(74) *Attorney, Agent, or Firm* — Holland & Hart LLP

(57) ABSTRACT

Methods, systems, and devices for wireless communications are described. A user equipment (UE) may transmit concurrent messages over a sidelink channel to another UE and over an uplink channel to a base station. The UE may transmit, to a base station, a report indicating a capability of the UE to concurrently transmit over a sidelink channel and an uplink channel. The UE may receive, from the base station and based on the report, a transmission configuration scheduling a concurrent sidelink and uplink transmission within a resource shared by the sidelink channel and the uplink channel. The UE may then transmit the concurrent sidelink and uplink transmission within the resource shared by the sidelink channel and the uplink channel based on the transmission configuration. The other UE and the base station may receive the concurrent sidelink and uplink transmission and may decode different layers of the transmission.

30 Claims, 15 Drawing Sheets

(51) Int. Cl.
*H04W 72/1268* (2023.01)
*H04W 72/21* (2023.01)
*H04W 72/542* (2023.01)

(56) References Cited

U.S. PATENT DOCUMENTS

| | | | | |
|---|---|---|---|---|
| 2020/0008230 | A1* | 1/2020 | Yu | H04L 5/0005 |
| 2020/0146010 | A1* | 5/2020 | Abdoli | H04L 5/0044 |
| 2020/0229188 | A1* | 7/2020 | Tang | H04W 72/0453 |
| 2020/0359428 | A1* | 11/2020 | Pan | H04W 76/12 |
| 2020/0396701 | A1* | 12/2020 | Yi | H04W 52/367 |
| 2021/0051653 | A1* | 2/2021 | Park | H04W 72/0413 |
| 2021/0385845 | A1* | 12/2021 | Zhao | H04L 5/0091 |
| 2022/0015070 | A1* | 1/2022 | Chen | H04L 1/0003 |
| 2022/0159588 | A1* | 5/2022 | Wang | H04W 52/367 |
| 2022/0225341 | A1* | 7/2022 | Li | H04W 28/0875 |
| 2022/0256559 | A1* | 8/2022 | Ding | H04W 72/23 |
| 2022/0279537 | A1* | 9/2022 | Freda | H04W 72/569 |
| 2022/0303955 | A1* | 9/2022 | He | H04L 1/1819 |

OTHER PUBLICATIONS

Huawei, et al., "UE RF Capability Reporting for V2X," 3GPP Draft, 3GPP TSG RAN WG2 Meeting #97, R2-1701374, UE RF Capability Reporting for V2X, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 13, 2017-Feb. 17, 2017, Feb. 12, 2017 (Feb. 12, 2017), XP051212035, 2 pages, Retrieved from the Internet: URL: http://www.3gpp.org/ftp/Meetings_3GPP_SYNC/RAN2/Docs/ [retrieved on Feb. 12, 2017] the whole document.
International Search Report and Written Opinion—PCT/US2020/065033—ISA/EPO—dated Feb. 9, 2021.
LG Electronics Inc: "Discussion on SL-RSRP Report to gNB in NR SL", 3GPP Draft, 3GPP TSG RAN WG2 Meeting #107, R2-1911435, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019-Aug. 30, 2019, Aug. 16, 2019 (Aug. 16, 2019), XP051769192, 3 pages, Retrieved from the Internet: URL: http://www.3gpp.org/ftp/tsg_ran/WG2_RL2/TSGR2_107/Docs/R2-1911435.zip [retrieved on Aug. 16, 2019] Section "2. Discussion", first paragraph.
OPPO: "Discussion on UL and SL Prioritization for NR-V2X," 3GPP Draft, 3GPP TSG-AAN WG1 Meeting #98bis, R1-1910377, OPPO—LS Discussion, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 8, 2019 (Oct. 8, 2019), XP051809107, 6 pages, Retrieved from the Internet: URL: https://ftp.3gpp.org/tsg_ran/WG1_RL1/TSGR1_98b/Docs/R1-1910377.zip R1-1910377 OPPO—LS discussion.docx [retrieved on Oct. 8, 2019] 11 Discussion on Q1.

\* cited by examiner

CONCURRENT SIDELINK AND UPLINK TRANSMISSION

CROSS REFERENCE

The present application for patent claims the benefit of U.S. Provisional Patent Application No. 62/951,928 by Balasubramanian et al., entitled "CONCURRENT SIDELINK AND UPLINK TRANSMISSION," filed Dec. 20, 2019, assigned to the assignee hereof, and expressly incorporated by reference in its entirety herein.

FIELD OF TECHNOLOGY

The following relates generally to wireless communications and more specifically to concurrent sidelink and uplink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station over an uplink communication channel in a first resource and may also communicate with neighboring UEs over a sidelink communications channel in a second resource that differs from the first resource. Conventional uplink and sidelink communication techniques may be deficient.

SUMMARY

The described techniques relate to improved methods, systems, devices, and apparatuses that support concurrent sidelink and uplink transmission. Generally, the described techniques provide for concurrent sidelink and uplink transmissions by a user equipment in a wireless communication system, such as a vehicle to vehicle (V2V) or vehicle to everything (V2X) communications system. A UE may transmit concurrent messages over sidelink communications channels to other UEs and also transmit uplink communications channels to base stations. The UE may transmit, to a base station, a report indicating a capability of the UE to concurrently transmit over a sidelink channel and an uplink channel. The UE may receive, from the base station and based on the report, a transmission configuration scheduling a concurrent sidelink and uplink transmission within a resource shared by the sidelink channel and the uplink channel. The UE may then transmit the concurrent sidelink and uplink transmission within the resource shared by the sidelink channel and the uplink channel based on the transmission configuration. Other UEs and one or more base stations may receive the concurrent sidelink and uplink transmission and may decode different layers of the transmission based on the receive channel quality at the device.

A method of wireless communications by a UE is described. The method may include transmitting a report indicating a capability of the UE to concurrently transmit over a sidelink channel and an uplink channel, receiving, based on the report, a transmission configuration scheduling a concurrent sidelink and uplink transmission within a resource shared by the sidelink channel and the uplink channel, and transmitting the concurrent sidelink and uplink transmission within the resource shared by the sidelink channel and the uplink channel based on the transmission configuration.

An apparatus for wireless communications by a UE is described. The apparatus may include a processor, memory coupled with the processor, and instructions stored in the memory. The instructions may be executable by the processor to cause the apparatus to transmit a report indicating a capability of the UE to concurrently transmit over a sidelink channel and an uplink channel, receive, based on the report, a transmission configuration scheduling a concurrent sidelink and uplink transmission within a resource shared by the sidelink channel and the uplink channel, and transmit the concurrent sidelink and uplink transmission within the resource shared by the sidelink channel and the uplink channel based on the transmission configuration.

Another apparatus for wireless communications by a UE is described. The apparatus may include means for transmitting a report indicating a capability of the UE to concurrently transmit over a sidelink channel and an uplink channel, receiving, based on the report, a transmission configuration scheduling a concurrent sidelink and uplink transmission within a resource shared by the sidelink channel and the uplink channel, and transmitting the concurrent sidelink and uplink transmission within the resource shared by the sidelink channel and the uplink channel based on the transmission configuration.

A non-transitory computer-readable medium storing code for wireless communications by a UE is described. The code may include instructions executable by a processor to transmit a report indicating a capability of the UE to concurrently transmit over a sidelink channel and an uplink channel, receive, based on the report, a transmission configuration scheduling a concurrent sidelink and uplink transmission within a resource shared by the sidelink channel and the uplink channel, and transmit the concurrent sidelink and uplink transmission within the resource shared by the sidelink channel and the uplink channel based on the transmission configuration.

In some examples of the method, apparatuses, and non-transitory computer-readable medium described herein, transmitting the report may include operations, features, means, or instructions for transmitting the report that includes an indication of intent to concurrently transmit over the sidelink channel and the uplink channel.

In some examples of the method, apparatuses, and non-transitory computer-readable medium described herein, transmitting the concurrent sidelink and uplink transmission may include operations, features, means, or instructions for transmitting the concurrent sidelink and uplink transmission based on a sidelink transmission encoded as a base layer of the concurrent sidelink and uplink transmission.

In some examples of the method, apparatuses, and non-transitory computer-readable medium described herein, transmitting the concurrent sidelink and uplink transmission may include operations, features, means, or instructions for transmitting the concurrent sidelink and uplink transmission based on an uplink transmission encoded as an enhancement layer of the concurrent sidelink and uplink transmission.

Some examples of the method, apparatuses, and non-transitory computer-readable medium described herein may further include operations, features, means, or instructions for transmitting a first path quality metric of the sidelink channel and a second path quality metric of the uplink channel, where the transmission configuration may be based on the first path quality metric and the second path quality metric.

In some examples of the method, apparatuses, and non-transitory computer-readable medium described herein, each of the first path quality metric and the second path quality metric may be a path loss metric.

Some examples of the method, apparatuses, and non-transitory computer-readable medium described herein may further include operations, features, means, or instructions for transmitting a sidelink resource request, where the transmission configuration may be received based on the sidelink resource request.

Some examples of the method, apparatuses, and non-transitory computer-readable medium described herein may further include operations, features, means, or instructions for transmitting an uplink resource request, where the transmission configuration may be received based on the uplink resource request.

In some examples of the method, apparatuses, and non-transitory computer-readable medium described herein, receiving the transmission configuration may include operations, features, means, or instructions for receiving the transmission configuration that includes a resource assignment that indicates the resource.

In some examples of the method, apparatuses, and non-transitory computer-readable medium described herein, receiving the transmission configuration may include operations, features, means, or instructions for receiving the transmission configuration that indicates a grant for scheduling the concurrent sidelink and uplink transmission.

In some examples of the method, apparatuses, and non-transitory computer-readable medium described herein, receiving the transmission configuration may include operations, features, means, or instructions for receiving the transmission configuration that indicates a first transmission parameter for a sidelink transmission of the concurrent sidelink and uplink transmission and a second transmission parameter for an uplink transmission of the concurrent sidelink and uplink transmission, or both.

In some examples of the method, apparatuses, and non-transitory computer-readable medium described herein, the first transmission parameter may be a first modulation and coding scheme (MCS) for the sidelink transmission, the second transmission parameter may be a second MCS for the uplink transmission, or both.

In some examples of the method, apparatuses, and non-transitory computer-readable medium described herein, receiving the transmission configuration may include operations, features, means, or instructions for receiving the transmission configuration that indicates a power split between a sidelink transmission of the concurrent sidelink and uplink transmission and an uplink transmission of the concurrent sidelink and uplink transmission.

In some examples of the method, apparatuses, and non-transitory computer-readable medium described herein, receiving the transmission configuration may include operations, features, means, or instructions for receiving the transmission configuration that indicates a power control parameter for the concurrent sidelink and uplink transmission.

In some examples of the method, apparatuses, and non-transitory computer-readable medium described herein, transmitting the concurrent sidelink and uplink transmission may include operations, features, means, or instructions for transmitting the concurrent sidelink and uplink transmission in accordance with the power split and a power budget determined based on the power control parameter.

A method of wireless communications by a base station is described. The method may include receiving a report indicating a capability of a UE to concurrently transmit over a sidelink channel and an uplink channel, transmitting, based on the report, a transmission configuration scheduling a concurrent sidelink and uplink transmission within a resource shared by the sidelink channel and the uplink channel, and receiving the concurrent sidelink and uplink transmission within the resource shared by the sidelink channel and the uplink channel based on the transmission configuration.

An apparatus for wireless communications by a base station is described. The apparatus may include a processor, memory coupled with the processor, and instructions stored in the memory. The instructions may be executable by the processor to cause the apparatus to receive a report indicating a capability of a UE to concurrently transmit over a sidelink channel and an uplink channel, transmit, based on the report, a transmission configuration scheduling a concurrent sidelink and uplink transmission within a resource shared by the sidelink channel and the uplink channel, and receive the concurrent sidelink and uplink transmission within the resource shared by the sidelink channel and the uplink channel based on the transmission configuration.

Another apparatus for wireless communications by a base station is described. The apparatus may include means for receiving a report indicating a capability of a UE to concurrently transmit over a sidelink channel and an uplink channel, transmitting, based on the report, a transmission configuration scheduling a concurrent sidelink and uplink transmission within a resource shared by the sidelink channel and the uplink channel, and receiving the concurrent sidelink and uplink transmission within the resource shared by the sidelink channel and the uplink channel based on the transmission configuration.

A non-transitory computer-readable medium storing code for wireless communications by a base station is described. The code may include instructions executable by a processor to receive a report indicating a capability of a UE to concurrently transmit over a sidelink channel and an uplink channel, transmit, based on the report, a transmission configuration scheduling a concurrent sidelink and uplink transmission within a resource shared by the sidelink channel and the uplink channel, and receive the concurrent sidelink and uplink transmission within the resource shared by the sidelink channel and the uplink channel based on the transmission configuration.

In some examples of the method, apparatuses, and non-transitory computer-readable medium described herein, receiving the report may include operations, features, means, or instructions for receiving the report that includes an indication of intent to concurrently transmit over the sidelink channel and the uplink channel.

In some examples of the method, apparatuses, and non-transitory computer-readable medium described herein, receiving the concurrent sidelink and uplink transmission may include operations, features, means, or instructions for receiving the concurrent sidelink and uplink transmission based on a sidelink transmission encoded as a base layer of the concurrent sidelink and uplink transmission.

In some examples of the method, apparatuses, and non-transitory computer-readable medium described herein, receiving the concurrent sidelink and uplink transmission may include operations, features, means, or instructions for receiving the concurrent sidelink and uplink transmission based on an uplink transmission encoded as an enhancement layer of the concurrent sidelink and uplink transmission.

Some examples of the method, apparatuses, and non-transitory computer-readable medium described herein may further include operations, features, means, or instructions for decoding the concurrent sidelink and uplink transmission based on the transmission configuration and cancelling a sidelink transmission encoded as a base layer of the concurrent sidelink and uplink transmission.

Some examples of the method, apparatuses, and non-transitory computer-readable medium described herein may further include operations, features, means, or instructions for receiving a first path quality metric of the sidelink channel and a second path quality metric of the uplink channel, where the transmission configuration may be based on the first path quality metric and the second path quality metric.

In some examples of the method, apparatuses, and non-transitory computer-readable medium described herein, each of the first path quality metric and the second path quality metric may be a path loss metric.

Some examples of the method, apparatuses, and non-transitory computer-readable medium described herein may further include operations, features, means, or instructions for receiving a sidelink resource request, where the transmission configuration may be received based on the sidelink resource request.

Some examples of the method, apparatuses, and non-transitory computer-readable medium described herein may further include operations, features, means, or instructions for receiving an uplink resource request, where the transmission configuration may be received based on the uplink resource request.

In some examples of the method, apparatuses, and non-transitory computer-readable medium described herein, transmitting the transmission configuration may include operations, features, means, or instructions for transmitting the transmission configuration that includes a resource assignment that indicates the resource.

In some examples of the method, apparatuses, and non-transitory computer-readable medium described herein, transmitting the transmission configuration may include operations, features, means, or instructions for transmitting the transmission configuration that indicates a grant for scheduling the concurrent sidelink and uplink transmission.

In some examples of the method, apparatuses, and non-transitory computer-readable medium described herein, transmitting the transmission configuration may include operations, features, means, or instructions for transmitting the transmission configuration that indicates a first transmission parameter for a sidelink transmission of the concurrent sidelink and uplink transmission and a second transmission parameter for an uplink transmission of the concurrent sidelink and uplink transmission, or both.

In some examples of the method, apparatuses, and non-transitory computer-readable medium described herein, the first transmission parameter may be a first MCS for the sidelink transmission, the second transmission parameter may be a second MCS for the uplink transmission, or both.

In some examples of the method, apparatuses, and non-transitory computer-readable medium described herein, transmitting the transmission configuration may include operations, features, means, or instructions for transmitting the transmission configuration that indicates a power split between a sidelink transmission of the concurrent sidelink and uplink transmission and an uplink transmission of the concurrent sidelink and uplink transmission.

In some examples of the method, apparatuses, and non-transitory computer-readable medium described herein, transmitting the transmission configuration may include operations, features, means, or instructions for transmitting the transmission configuration that indicates a power control parameter for the concurrent sidelink and uplink transmission.

In some examples of the method, apparatuses, and non-transitory computer-readable medium described herein, receiving the concurrent sidelink and uplink transmission may include operations, features, means, or instructions for receiving the concurrent sidelink and uplink transmission in accordance with the power split and a power budget determined based on the power control parameter.

DETAILED DESCRIPTION

Figure 1:
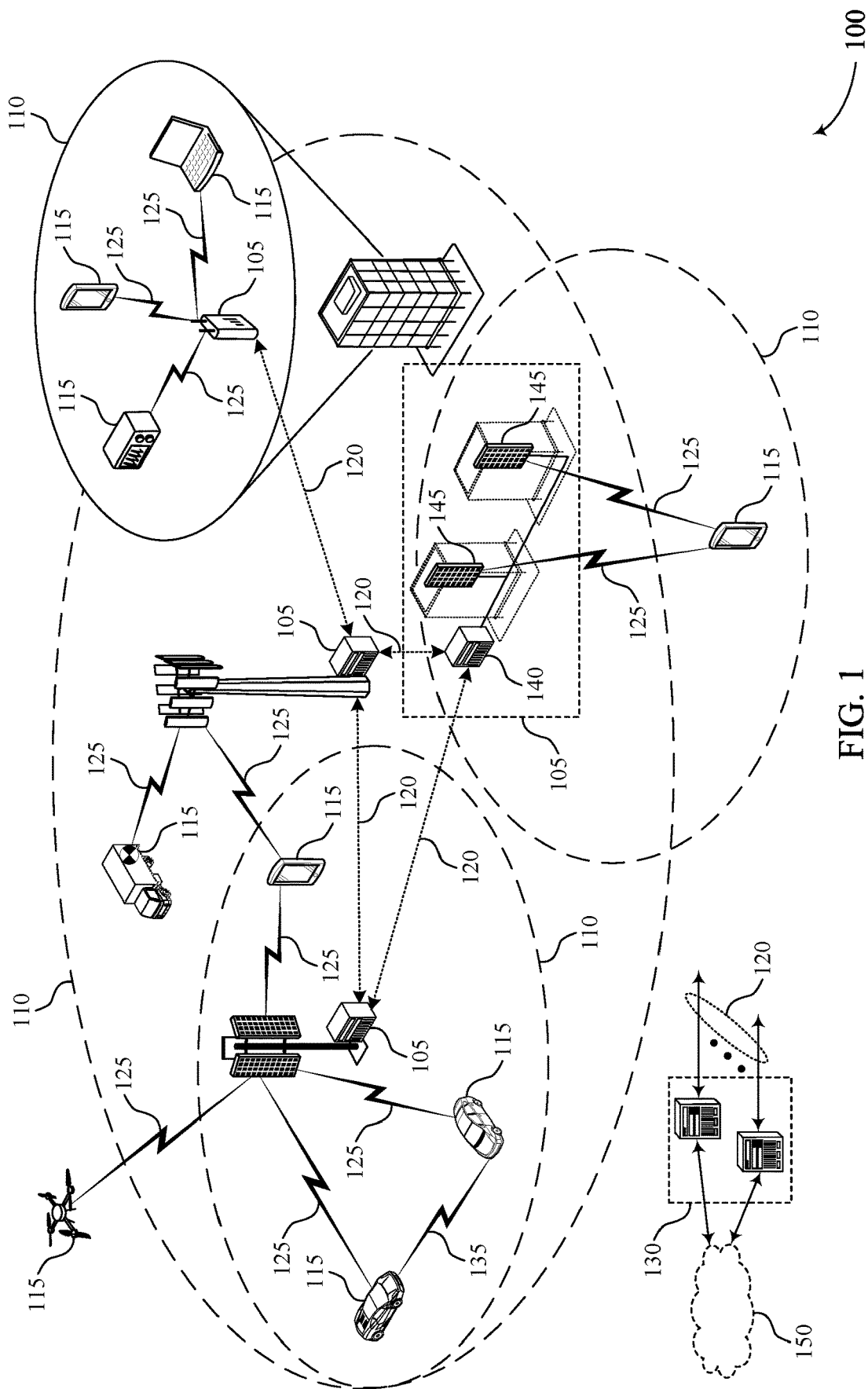
FIG. 1 illustrates an example of a wireless communications system in accordance with aspects of the present disclosure.

A user equipment (UE) may communicate with a base station over uplink channels and may also communicate with neighboring UEs over a sidelink communications channel. A UE communicating over a sidelink channel to other neighboring UEs may be an example of a vehicle in a vehicle to vehicle (V2V) or a vehicle to everything (V2X) wireless communication system. In some cases, separate resources may be assigned for sidelink transmissions and for uplink transmissions, such as in conventional Mode-1 V2X systems. The UE may perform channel monitoring, which may include periodic channel measurements such as a measurement of the signal-to-noise ratio (SNR) of one or more channels. The sidelink communications channel may sometimes have a lower SNR than the uplink communications channel. This SNR mismatch may be utilized to obtain higher throughput communications by the transmitting UE.

In an example, a UE may transmit sidelink communications in a base layer, and the UE may transmit uplink communications in an enhancement layer. For example, a UE may encode data to be transmitted in a sidelink channel (e.g., a physical sidelink shared channel (PSSCH)) as the base layer, and encoding data to be transmitted in a physical uplink shared channel (PUSCH) as enhancement layer. The base layer and the enhancement layer may be superimposed in a superposition transmission such that the UE may transmit the base layer and the enhancement layer simultaneously. The base layer in a superposition transmission may be encoded based on the weaker link (e.g., based on the channel with the lower SNR), and the enhancement layer may be encoded based on the stronger link (e.g., based on the channel with the higher SNR). Thus, the UE may transmit a concurrent transmission within a same resource that includes the base layer and the enhancement layer, which may lead to a higher spectral efficiency.

A UE simultaneously transmitting the concurrent sidelink (SL) and uplink (UL) communications (e.g., concurrent SL and UL or Uu transmission) may indicate an intent to perform concurrent transmission to a base station, or may communicate an indication of a capability to perform concurrent transmission to the base station. In some cases, the UE may transmit a report indicating the capability to perform concurrent transmission to the base station. Capability reporting may be accomplished using a UE capability message, transmission of an information element indicating the capability, or other types of messages. In some cases, the reporting may be an implicit indication that the UE is capable of performing concurrent transmission. For example, the UE may indicate a transmission mode that includes the capability of performing concurrent transmission. The base station may grant sidelink and uplink resources based on the intent or the capability of the UE. The UE may then encode the data to be transmitted concurrently, and may transmit the concurrent base layer and enhancement layers over the sidelink and uplink channels.

Due to the lower SNR in the sidelink channel, the receiving UE may be able to decode the base layer, which may include the sidelink transmission message, and the enhancement layer may likely not be received by the receiving UE due to the lower SNR of the sidelink channel. Due to the higher SNR in the uplink channel, the base station may be able to receive and decode both the base layer and the enhancement layer of the transmission, and the base station may be able to decode the relevant uplink information of the concurrent transmission by cancelling the base layer from the received transmission to obtain the enhancement layer. As such, the same resource allocation may be used to transmit information over the sidelink channel and the uplink channel.

Aspects of the disclosure are initially described in the context of wireless communications systems. Aspects of the disclosure are with described in the context of a process flow diagram. Aspects of the disclosure are further illustrated by and described with reference to apparatus diagrams, system diagrams, and flowcharts that relate to concurrent sidelink and uplink transmission.

FIG. 1 illustrates an example of a wireless communications system 100 that supports concurrent sidelink and uplink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In a wireless communication system, such as a V2V or V2X communications system, a UE 115 may transmit concurrent messages over sidelink communications channels to other UEs 115 and uplink communications channels to base stations 105. The UE 115 may transmit, to a base station 105, a report or a transmission indicating a capability of the UE 115 to concurrently transmit over a sidelink channel and an uplink channel. The UE 115 may receive, from the base station 105 and based on the report, a transmission configuration scheduling a concurrent sidelink and uplink transmission within a resource chares by the sidelink channel and the uplink channel. The UE 115 may then transmit the concurrent sidelink and uplink transmission within the resource shared by the sidelink channel and the uplink channel based on the transmission configuration. Other UEs 115 and one or more base stations 105 may receive the concurrent sidelink and uplink transmission and may decode different layers of the transmission based on the receive channel quality at the device.

Figure 2:
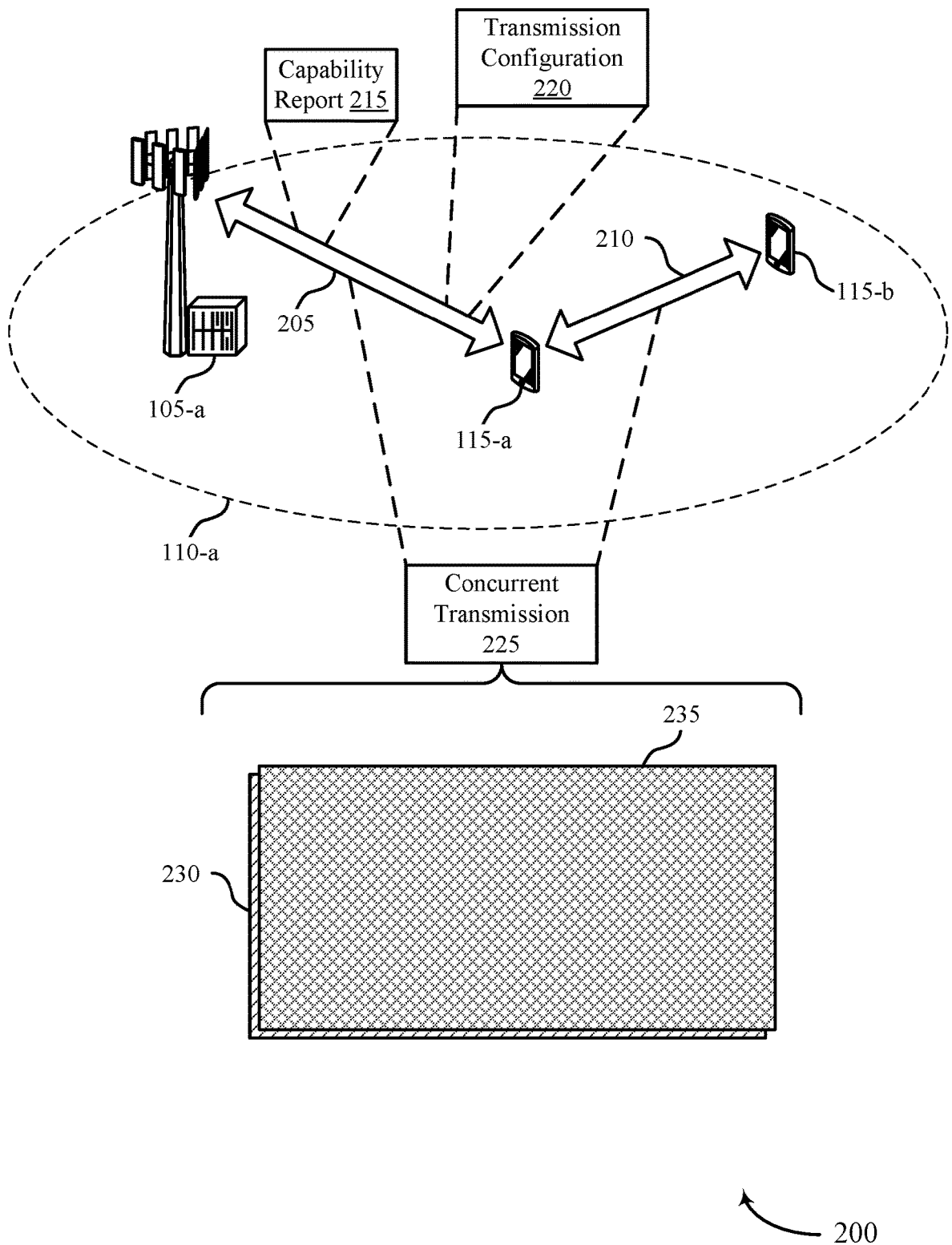
FIG. 2 illustrates an example of a wireless communications system in accordance with aspects of the present disclosure.

FIG. 2 illustrates an example of a wireless communications system 200 that supports concurrent sidelink and uplink transmission in accordance with aspects of the present disclosure. In some examples, wireless communications system 200 may implement aspects of wireless communication system 100. UE 115-$a$ and UE 115-$b$ may be examples of UEs 115 as described with reference to FIG. 1. Base station 105-$a$ may be an example of a base station 105 as described with reference to FIG. 1. UE 115-$a$ may communicate with base station 105-$b$ by receiving and transmitting signaling over communication channel 205. UE 115-$a$ may communicate with UE 115-$b$ by receiving and transmitting signaling over sidelink channel 210. UEs 115 may be example of vehicles in a V2V or V2X wireless communications system.

UE 115-$a$ may periodically measure channel quality parameters of communication channel 205 and sidelink channel 210. UE 115-$a$ may measure the SNR of both channel 205 and 210, and may determine that sidelink channel 210 has a lower SNR, or another channel quality measurement. This may lead to a case of SNR mismatch in cases where channel 205 has a relatively higher SNR than the sidelink channel 210. UE 115-$a$ may utilize the SNR mismatch between the uplink channel 205 and the sidelink channel 210 to transmit a concurrent sidelink and uplink transmission within a resource shared by the sidelink channel 210 and the uplink channel 205 to obtain higher spectral efficiency.

UE 115-$a$ may perform a path loss measurement (e.g., an average path loss measurement) experienced in the sidelink channel 210 over a particular time window $T_W$. UE 115-$a$ may perform this measurement by determining the reference signal receive power (RSRP) of sidelink channel 210, and also by receiving sidelink control information (SCI) and decoding SCI over the sidelink channel 210 from nearby UEs, such as from UE 115-$b$.

UE 115-$b$ may indicate an intent to perform concurrent sidelink and uplink transmissions to transmitting an indication to base station 105-$a$. The indication of the intent to perform the concurrent transmission may implicitly indicate, to the base station a capability to perform the concurrent transmissions. In some cases, UE 115-$a$ may also transmit a capability report 215 to base station 105-$a$ indicating a capability of UE 115-$a$ to perform concurrent sidelink and uplink transmissions. In some cases, the indication of the intent may be included in capability report 215.

UE 115-$a$ may also transmit, to base station 105-$a$, a request of sidelink transmission resources. The request of sidelink transmission resources may be based on a sidelink packet priority, a buffer status report (BSR), or both. UE 115-$a$ may also report the sidelink quality (e.g., SNR or other measurements) to base station 105-$a$, in addition to other path loss reporting (e.g., Uu path loss reporting) to base station 105-$a$.

UE 115-$a$ may also request uplink resources by transmitting a request to base station 105-$a$. UE 115-$a$ may also be configured with uplink resources (e.g., based on prior RRC or downlink control information (DCI) messaging). Base station 105-$a$ may transmit a transmission configuration 220 which may indicate the common resources over which base layer 230 encoding of sidelink channel 210 transmissions and enhancement layer 235 encoding of uplink communications on channel 205 may be performed. Base layer 230 may include sidelink information or data and enhancement layer 235 may include uplink information or data. Base layer 230 and enhancement layer 235 may be allocated the same resources. Base layer 230 may include lower quality or lower fidelity data than enhancement layer 235, and enhancement layer may include data encoded with scaled coding, such that enhancement layer 235 and base layer 230 may be decoded when transmitted in a high quality channel, and base layer 230 may be decoded and the enhancement layer may not be received due to being transmitted in a lower quality channel (e.g., based on the SNR of the channel).

Transmission configuration 220 may also include a set of parameters based on sidelink path quality metrics, uplink path quality metrics, priority levels of sidelink communications and uplink communications, and the requested resources, report by UE 115-$a$. The parameters may include a resource grant indicating a resource shared by the uplink channel and the sidelink channel that may completely or at least partially overlap in time, frequency, or both. The parameters may also include a first modulation and coding scheme (MCS) for the sidelink transmission and a second MCS for the uplink transmission that may be the same as or different form the first MCS. The parameters may indicate a power split between the sidelink transmission and the uplink transmission. For example, the power split may indicate power levels used for each of the sidelink transmission in base layer 230 and the uplink transmission in enhancement layer 235. The power split β may be defined such that the power split between the sidelink channel and the uplink channel is 0≤β≤1. The parameters may indicate open loop control parameters (e.g., Po, alpha) for concurrent sidelink and uplink transmissions. For example, the open loop power control parameters may include a $P_o$ value and an alpha value.

UE 115-a may determine a total power budget P based on the open loop power control parameters and the closed loop power control signaling received from base station 105-a (e.g., in physical downlink control channel (PDCCH) signaling). UE 115-a may then perform the concurrent transmission 225 using power βP for encoding base layer 230 and power (1−β)P for encoding the uplink enhancement layer 235 of concurrent transmission 225, using the MCS parameters indicated for sidelink and uplink. UE 115-a may transmit concurrent transmission 225 of base layer 230 and enhancement layer 235 in the same resources, and concurrent transmission 225 may be received by base station 105-a in channel 205 and may also be received by UE 115-b in sidelink channel 210.

UE 115-b may perform decoding of SCI contents to decode base layer 230 sidelink information of concurrent transmission 225. UE 115-b may be agnostic to the present of enhancement layer 235, may treat enhancement layer 235 of concurrent transmission 225 as noise, or both. Base station 105-a may decode and obtain enhancement layer 235 of concurrent transmission 225 by also ignoring or canceling sidelink base layer 230. Base station 105-a may be aware of the shared resource allocated for the sidelink channel and the uplink channel and the transmission parameters of sidelink communications in base layer 230, and may utilize those parameters to cancel the base layer 230 from a received concurrent sidelink and uplink transmission to decode enhancement layer 235.

Figure 3:
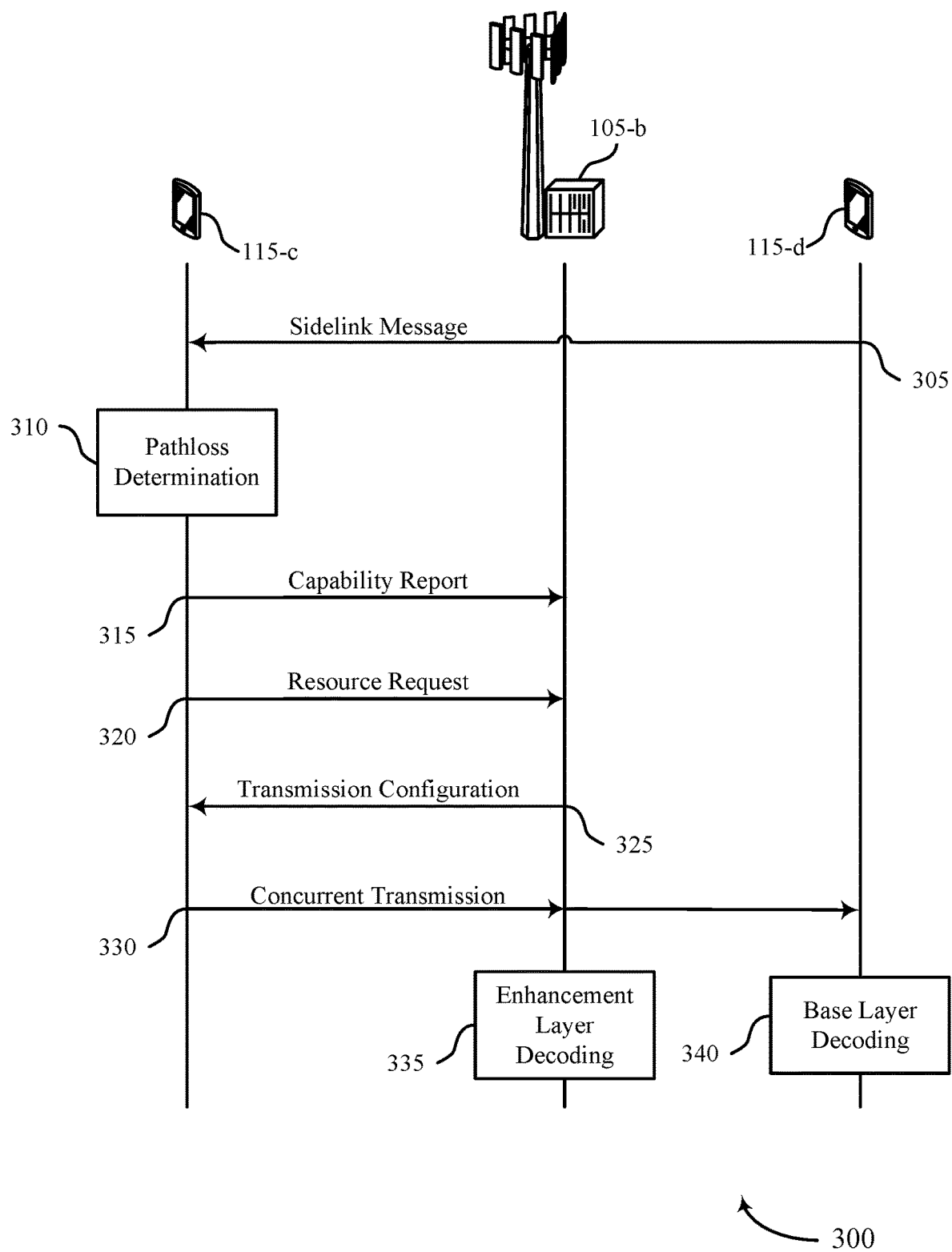
FIG. 3 illustrates an example of a process flow in accordance with aspects of the present disclosure.

FIG. 3 illustrates an example of a process flow 300 that supports concurrent sidelink and uplink transmission in accordance with aspects of the present disclosure. In some examples, process flow 300 may implement aspects of wireless communication system 100. UEs 115-c and 115-d may be examples of a UE 115 as described with reference to FIGS. 1 and 2. Base station 105-b may be an example of a base station 105 as described with reference to FIGS. 1 and 2. UEs 115 may be examples of vehicles, such as in a V2V or V2X wireless communications system.

UE 115-c and UE 115-d may communicate via a sidelink communications channel. For example, at 305 UE 115-d may transmit sidelink messages (e.g., SCI) to UE 115-c. Sidelink reception by UE 115-c may be from UEs in the vicinity, such as UE 115-d. UE 115-c may also communicate with base station 105-b by transmitting uplink messages and receiving downlink messages from base station 105-b.

At 310, UE 115-c may determine pathloss metrics for the sidelink channel and the uplink channel. UE 115-c may transmit, to base station 105-b, a first path quality metric of the sidelink channel and a second path quality metric of the uplink channel, where the transmission configuration may be based on the first path quality metric and the second path quality metric. Each of the first path quality metric and the second path quality metric may be a path loss metric, or another channel measurement.

At 315, UE 115-c may transmit a report indicating a capability of UE 115-c to concurrently transmit over a sidelink channel and an uplink channel. UE 115-c may transmit the report that includes an indication of intent to concurrently transmit over the sidelink channel and the uplink channel.

At 320, UE 115-c may transmit a resource request. UE 115-c may transmit a sidelink resource request, where the transmission configuration may be received based on the sidelink resource request. UE 115-c may also transmit an uplink resource request, where the transmission configuration may be received based on the uplink resource request. The resources requests may be transmitted jointly or as separate messages.

At 325, UE 115-c may receive, based on the capability report, a transmission configuration scheduling a concurrent sidelink and uplink transmission within a resource shared by the sidelink channel and the uplink channel. UE 115-c may receive the transmission configuration that includes a resource assignment that indicates the resource. UE 115-c may also receive the transmission configuration that indicates a grant for scheduling the concurrent sidelink and uplink transmission. The transmission configuration may also indicate a first transmission parameter for a sidelink transmission of the concurrent sidelink and uplink transmission and a second transmission parameter for an uplink transmission of the concurrent sidelink and uplink transmission, or both. The first transmission parameter may be a first MCS for the sidelink transmission, or the second transmission parameter may be a second MCS for the uplink transmission, or both.

The transmission configuration may also indicate a power split between a sidelink transmission of the concurrent sidelink and uplink transmission and an uplink transmission of the concurrent sidelink and uplink transmission. The transmission configuration may indicate a power control parameter for the concurrent sidelink and uplink transmission.

At 330, UE 115-c may transmit the concurrent sidelink and uplink transmission within the resource shared by the sidelink channel and the uplink channel based on the transmission configuration. UE 115-c may transmit the concurrent sidelink and uplink transmission based on a sidelink transmission encoded as a base layer of the concurrent sidelink and uplink transmission. UE 115-c may transmit the concurrent sidelink and uplink transmission based on an uplink transmission encoded as an enhancement layer of the concurrent sidelink and uplink transmission. UE 115-c may transmit the concurrent sidelink and uplink transmission in accordance with the power split and a power budget determined based on the power control parameter.

At 335, base station 105-b may decode the concurrent sidelink and uplink transmission based on the transmission configuration and cancelling a sidelink transmission encoded as a base layer of the concurrent sidelink and uplink transmission. Base station 105-b may therefore decode the uplink transmissions of the enhancement layer and may ignore the sidelink transmissions encoded in the base layer of the concurrent transmission.

At 340, UE 115-d may decode the concurrent sidelink and uplink transmission based on the transmission configuration. UE 115-d may decode the base layer, and may be unable to decode the enhancement layer due to the lower SNR of the sidelink channel. As such, UE 115-d may decode the sidelink transmissions intended for UE 115-d and may not decode uplink transmissions intended for base station 105-b.

Figure 4:
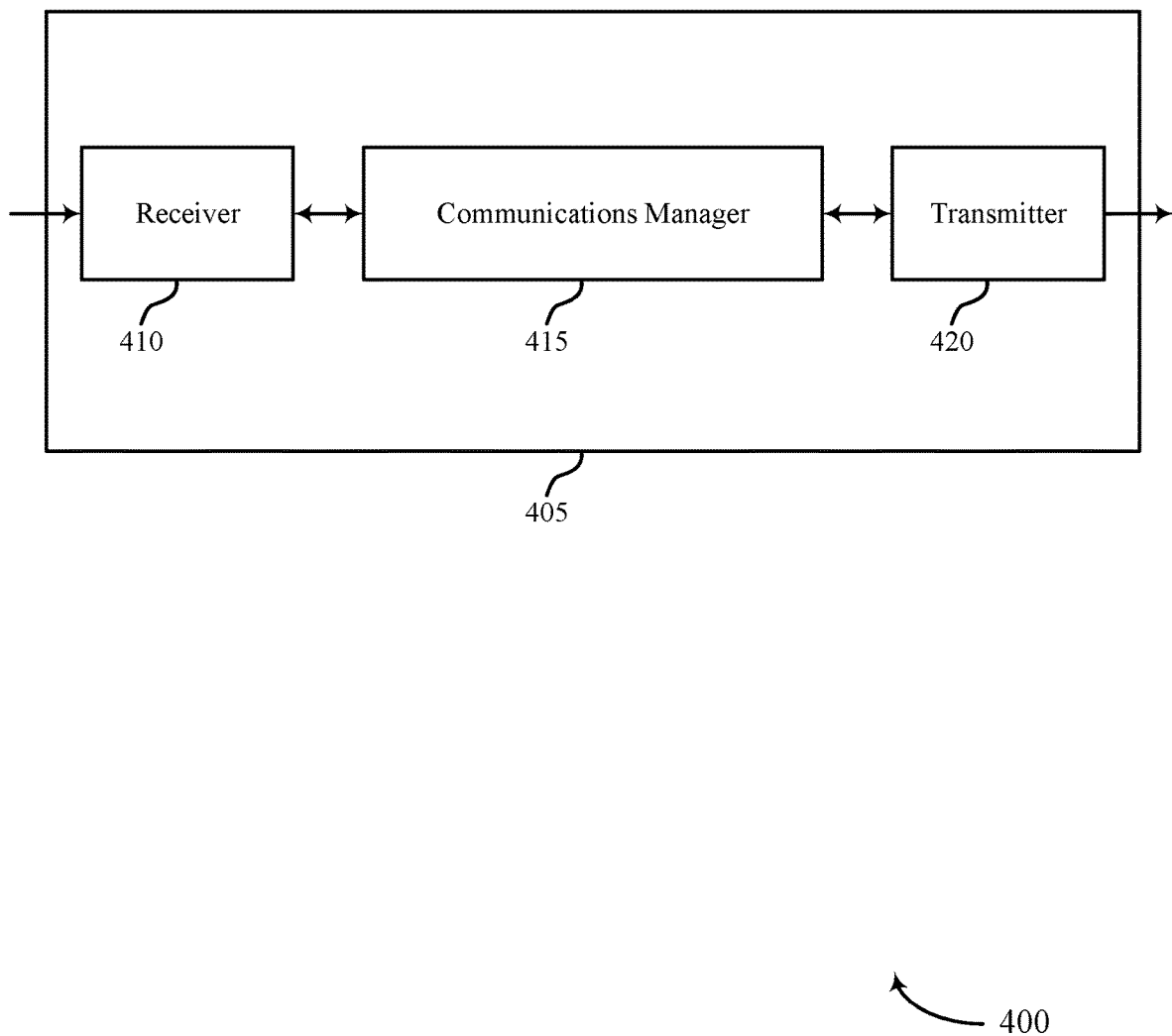
FIGS. 4 and 5 show block diagrams of devices in accordance with aspects of the present disclosure.

FIG. 4 shows a block diagram 400 of a device 405 that supports concurrent sidelink and uplink transmission in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to concurrent sidelink and uplink transmission, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit a report indicating a capability of the UE to concurrently transmit over a sidelink channel and an uplink channel, receive, based on the report, a transmission configuration scheduling a concurrent sidelink and uplink transmission within a resource shared by the sidelink channel and the uplink channel, and transmit the concurrent sidelink and uplink transmission within the resource shared by the sidelink channel and the uplink channel based on the transmission configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by communications manager 415 as described herein may be implemented to realize one or more potential advantages. One implementation may allow a UE 115 to save power and increase battery life by increasing the efficient use of resources and improving throughput. Additionally, the UE 115 may further reduce retransmissions by efficiently allocating sidelink and uplink transmissions based on measurements of channel quality.

Figure 5:
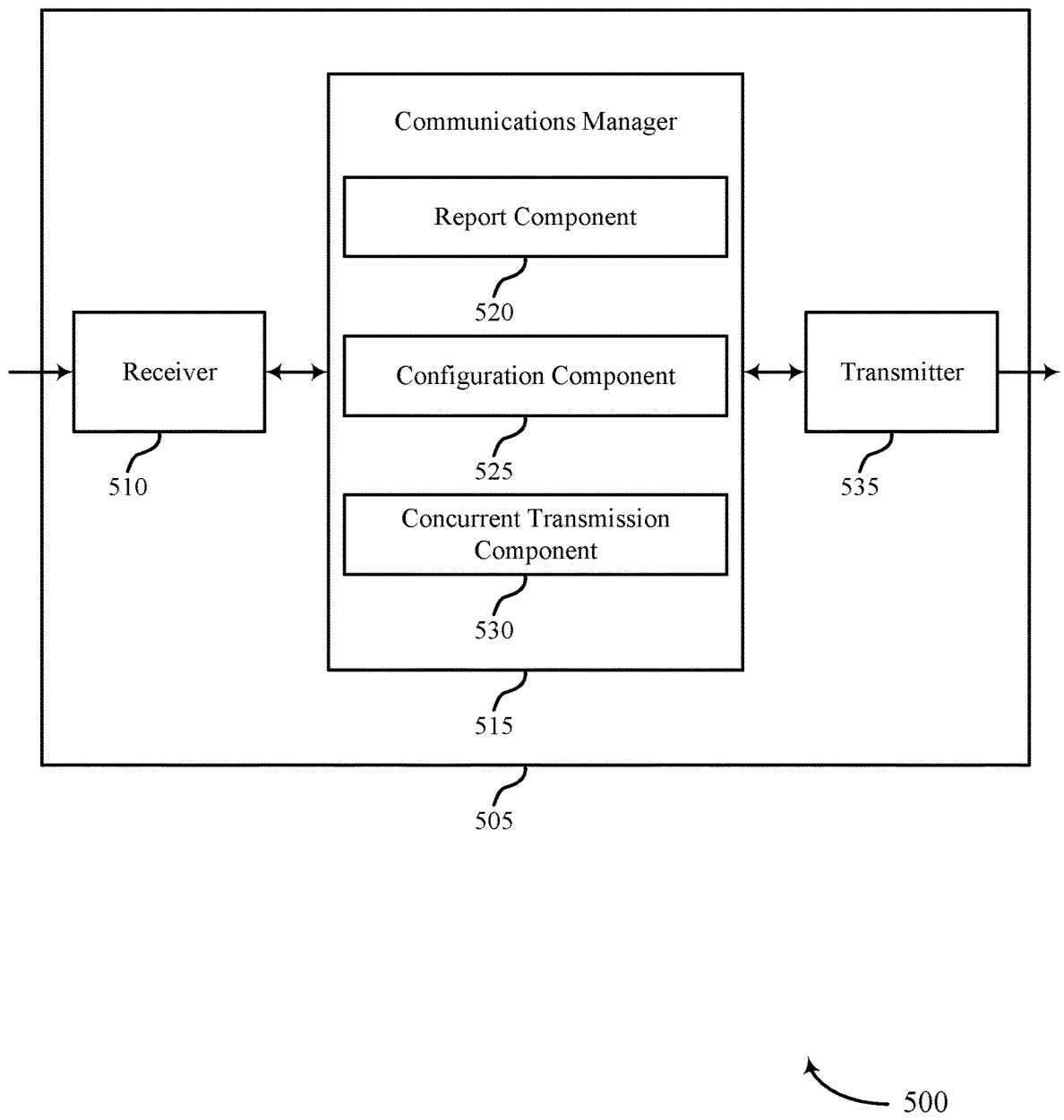

FIG. 5 shows a block diagram 500 of a device 505 that supports concurrent sidelink and uplink transmission in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to concurrent sidelink and uplink transmission, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a report component 520, a configuration component 525, and a concurrent transmission component 530. The communications manager 515 may be an example of aspects of the communications manager 710 described herein.

The report component 520 may transmit a report indicating a capability of the UE to concurrently transmit over a sidelink channel and an uplink channel. The configuration component 525 may receive, based on the report, a transmission configuration scheduling a concurrent sidelink and uplink transmission within a resource shared by the sidelink channel and the uplink channel.

The concurrent transmission component 530 may transmit the concurrent sidelink and uplink transmission within the resource shared by the sidelink channel and the uplink channel based on the transmission configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

A processor of a UE 115 (e.g., controlling the receiver 520, the transmitter 535, or the transceiver 720 as described with reference to FIG. 7) may efficiently measure channel quality of sidelink and uplink communication links. The processor of the UE 115 may further transmit, by operating transmitter 535, an indication of channel quality and concurrent transmission capability. The processor of the UE 115 may operate receiver 520 to receive, from a base station 105, a concurrent transmission resource configuration. The processor of the UE 115 may further efficiently encode and operate components of the UE 115 to improve throughput and efficient resource allocation, which may save power and increase battery life of the UE 115.

Figure 6:
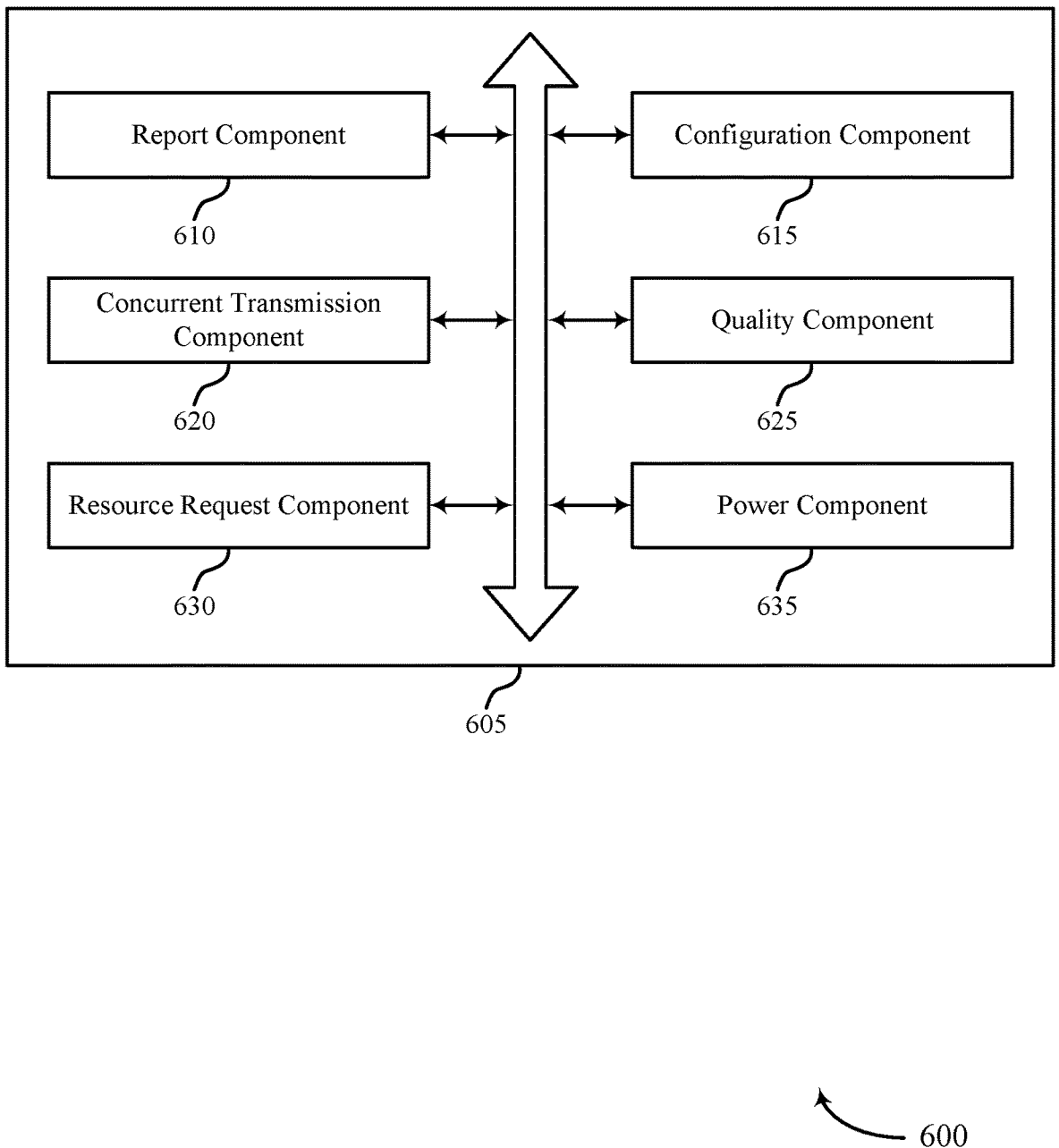
FIG. 6 shows a block diagram of a communications manager in accordance with aspects of the present disclosure.

FIG. 6 shows a block diagram 600 of a communications manager 605 that supports concurrent sidelink and uplink transmission in accordance with aspects of the present disclosure. The communications manager 605 may be an example of aspects of a communications manager 415, a communications manager 515, or a communications manager 710 described herein. The communications manager 605 may include a report component 610, a configuration component 615, a concurrent transmission component 620, a quality component 625, a resource request component 630, and a power component 635. Each of these modules may communicate, directly or indirectly, with one another (e.g., via one or more buses).

The report component 610 may transmit a report indicating a capability of the UE to concurrently transmit over a sidelink channel and an uplink channel.

In some examples, the report component 610 may transmit the report that includes an indication of intent to concurrently transmit over the sidelink channel and the uplink channel.

The configuration component 615 may receive, based on the report, a transmission configuration scheduling a concurrent sidelink and uplink transmission within a resource shared by the sidelink channel and the uplink channel.

In some examples, the configuration component 615 may receive the transmission configuration that includes a resource assignment that indicates the resource.

In some examples, the configuration component 615 may receive the transmission configuration that indicates a grant for scheduling the concurrent sidelink and uplink transmission.

In some examples, the configuration component 615 may receive the transmission configuration that indicates a first transmission parameter for a sidelink transmission of the concurrent sidelink and uplink transmission and a second transmission parameter for an uplink transmission of the concurrent sidelink and uplink transmission, or both.

In some cases, the first transmission parameter is a first MCS for the sidelink transmission, the second transmission parameter is a second MCS for the uplink transmission, or both.

The concurrent transmission component 620 may transmit the concurrent sidelink and uplink transmission within the resource shared by the sidelink channel and the uplink channel based on the transmission configuration.

In some examples, the concurrent transmission component 620 may transmit the concurrent sidelink and uplink transmission based on a sidelink transmission encoded as a base layer of the concurrent sidelink and uplink transmission.

In some examples, the concurrent transmission component 620 may transmit the concurrent sidelink and uplink transmission based on an uplink transmission encoded as an enhancement layer of the concurrent sidelink and uplink transmission.

In some examples, the concurrent transmission component 620 may transmit the concurrent sidelink and uplink transmission in accordance with the power split and a power budget determined based on the power control parameter.

The quality component 625 may transmit a first path quality metric of the sidelink channel and a second path quality metric of the uplink channel, where the transmission configuration is based on the first path quality metric and the second path quality metric.

In some cases, each of the first path quality metric and the second path quality metric is a path loss metric.

The resource request component 630 may transmit a sidelink resource request, where the transmission configuration is received based on the sidelink resource request.

In some examples, the resource request component 630 may transmit an uplink resource request, where the transmission configuration is received based on the uplink resource request.

The power component 635 may receive the transmission configuration that indicates a power split between a sidelink transmission of the concurrent sidelink and uplink transmission and an uplink transmission of the concurrent sidelink and uplink transmission.

In some examples, the power component 635 may receive the transmission configuration that indicates a power control parameter for the concurrent sidelink and uplink transmission.

Figure 7:
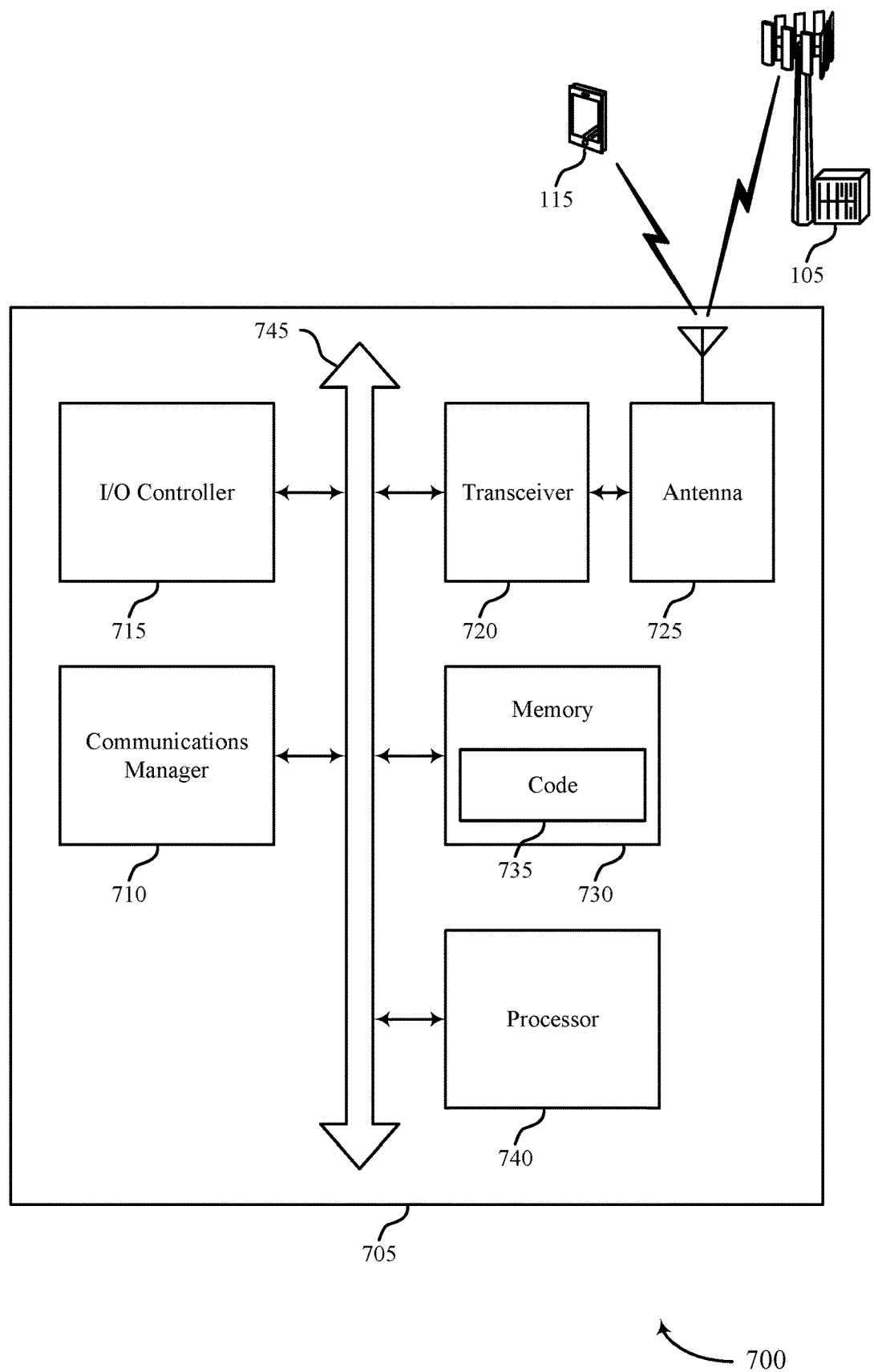
FIG. 7 shows a diagram of a system including a device in accordance with aspects of the present disclosure.

FIG. 7 shows a diagram of a system 700 including a device 705 that supports concurrent sidelink and uplink transmission in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit a report indicating a capability of the UE to concurrently transmit over a sidelink channel and an uplink channel, receive, based on the report, a transmission configuration scheduling a concurrent sidelink and uplink transmission within a resource shared by the sidelink channel and the uplink channel, and transmit the concurrent sidelink and uplink transmission within the resource shared by the sidelink channel and the uplink channel based on the transmission configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting concurrent sidelink and uplink transmission).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
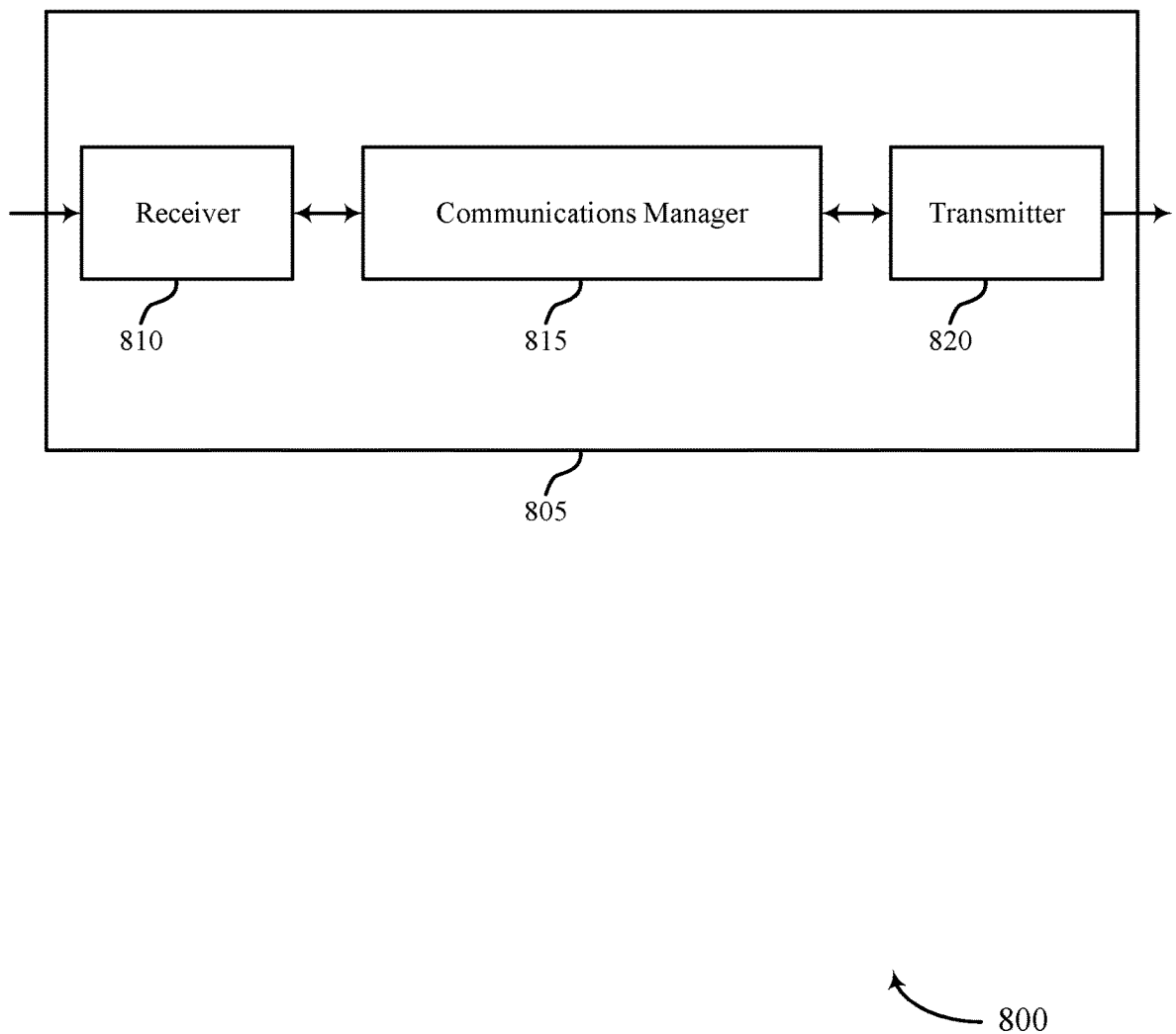
FIGS. 8 and 9 show block diagrams of devices in accordance with aspects of the present disclosure.

FIG. 8 shows a block diagram 800 of a device 805 that supports concurrent sidelink and uplink transmission in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to concurrent sidelink and uplink transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a report indicating a capability of a UE to concurrently transmit over a sidelink channel and an uplink channel, transmit, based on the report, a transmission configuration scheduling a concurrent sidelink and uplink transmission within a resource shared by the sidelink channel and the uplink channel, and receive the concurrent sidelink and uplink transmission within the resource shared by the sidelink channel and the uplink channel based on the transmission configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
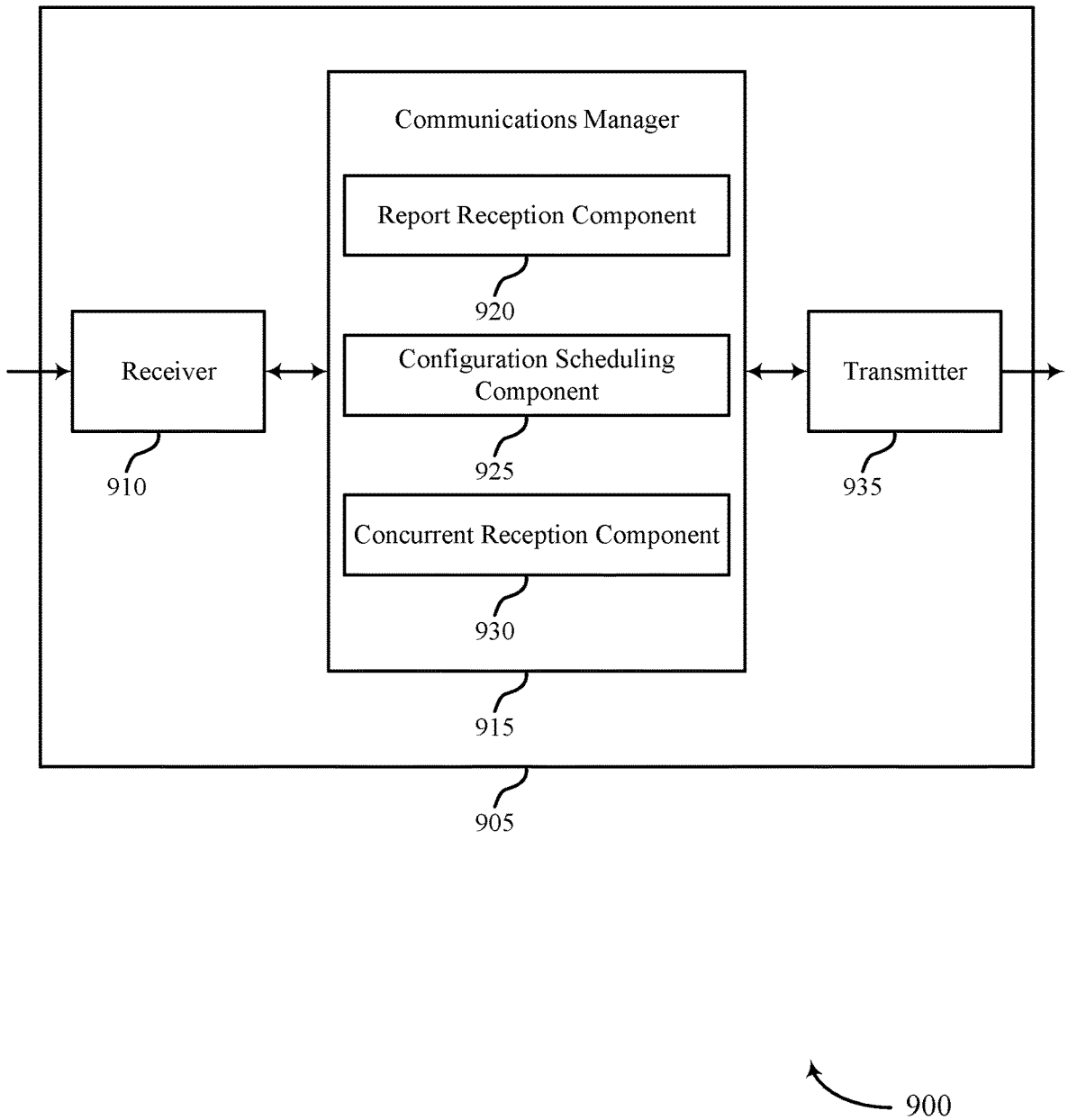

FIG. 9 shows a block diagram 900 of a device 905 that supports concurrent sidelink and uplink transmission in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to concurrent sidelink and uplink transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a report reception component 920, a configuration scheduling component 925, and a concurrent reception component 930. The communications manager 915 may be an example of aspects of the communications manager 1110 described herein.

The report reception component 920 may receive a report indicating a capability of a UE to concurrently transmit over a sidelink channel and an uplink channel.

The configuration scheduling component 925 may transmit, based on the report, a transmission configuration scheduling a concurrent sidelink and uplink transmission within a resource shared by the sidelink channel and the uplink channel.

The concurrent reception component 930 may receive the concurrent sidelink and uplink transmission within the resource shared by the sidelink channel and the uplink channel based on the transmission configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
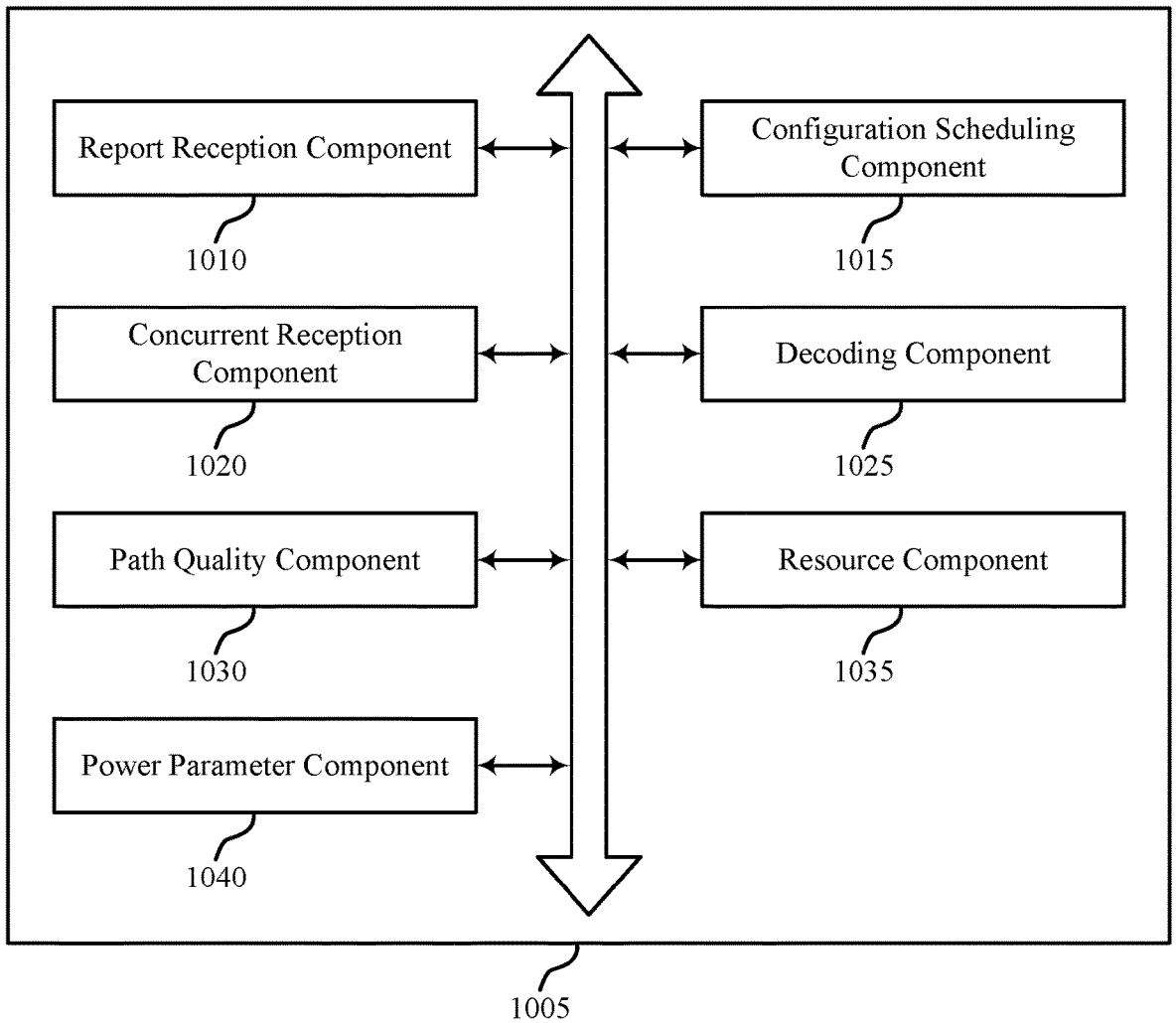
FIG. 10 shows a block diagram of a communications manager in accordance with aspects of the present disclosure.

FIG. 10 shows a block diagram 1000 of a communications manager 1005 that supports concurrent sidelink and uplink transmission in accordance with aspects of the present disclosure. The communications manager 1005 may be an example of aspects of a communications manager 815, a communications manager 915, or a communications manager 1110 described herein. The communications manager 1005 may include a report reception component 1010, a configuration scheduling component 1015, a concurrent reception component 1020, a decoding component 1025, a path quality component 1030, a resource component 1035, and a power parameter component 1040. Each of these modules may communicate, directly or indirectly, with one another (e.g., via one or more buses).

The report reception component 1010 may receive a report indicating a capability of a UE to concurrently transmit over a sidelink channel and an uplink channel.

In some examples, the report reception component 1010 may receive the report that includes an indication of intent to concurrently transmit over the sidelink channel and the uplink channel.

The configuration scheduling component 1015 may transmit, based on the report, a transmission configuration scheduling a concurrent sidelink and uplink transmission within a resource shared by the sidelink channel and the uplink channel.

In some examples, the configuration scheduling component 1015 may transmit the transmission configuration that includes a resource assignment that indicates the resource.

In some examples, the configuration scheduling component 1015 may transmit the transmission configuration that indicates a grant for scheduling the concurrent sidelink and uplink transmission.

In some examples, the configuration scheduling component 1015 may transmit the transmission configuration that indicates a first transmission parameter for a sidelink transmission of the concurrent sidelink and uplink transmission and a second transmission parameter for an uplink transmission of the concurrent sidelink and uplink transmission, or both.

In some cases, the first transmission parameter is a first MCS for the sidelink transmission, the second transmission parameter is a second MCS for the uplink transmission, or both.

The concurrent reception component 1020 may receive the concurrent sidelink and uplink transmission within the resource shared by the sidelink channel and the uplink channel based on the transmission configuration.

In some examples, the concurrent reception component 1020 may receive the concurrent sidelink and uplink transmission based on a sidelink transmission encoded as a base layer of the concurrent sidelink and uplink transmission.

In some examples, the concurrent reception component 1020 may receive the concurrent sidelink and uplink transmission based on an uplink transmission encoded as an enhancement layer of the concurrent sidelink and uplink transmission.

In some examples, the concurrent reception component 1020 may receive the concurrent sidelink and uplink transmission in accordance with the power split and a power budget determined based on the power control parameter.

The decoding component 1025 may decode the concurrent sidelink and uplink transmission based on the transmission configuration and cancelling a sidelink transmission encoded as a base layer of the concurrent sidelink and uplink transmission.

The path quality component 1030 may receive a first path quality metric of the sidelink channel and a second path quality metric of the uplink channel, where the transmission configuration is based on the first path quality metric and the second path quality metric.

In some cases, each of the first path quality metric and the second path quality metric is a path loss metric.

The resource component 1035 may receive a sidelink resource request, where the transmission configuration is received based on the sidelink resource request.

In some examples, the resource component 1035 may receive an uplink resource request, where the transmission configuration is received based on the uplink resource request.

The power parameter component 1040 may transmit the transmission configuration that indicates a power split between a sidelink transmission of the concurrent sidelink and uplink transmission and an uplink transmission of the concurrent sidelink and uplink transmission.

In some examples, the power parameter component 1040 may transmit the transmission configuration that indicates a power control parameter for the concurrent sidelink and uplink transmission.

Figure 11:
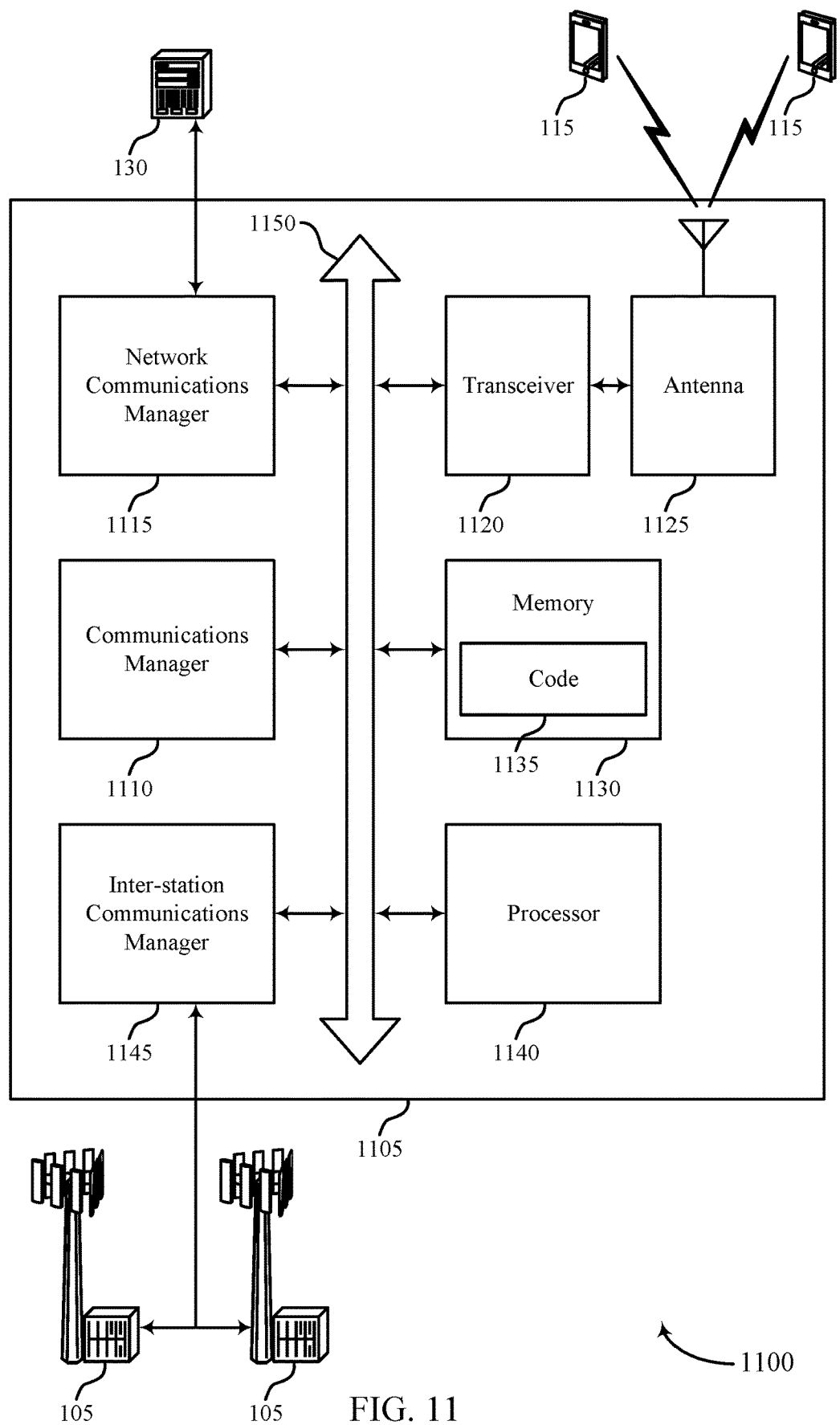
FIG. 11 shows a diagram of a system in accordance with aspects of the present disclosure.

FIG. 11 shows a diagram of a system 1100 including a device 1105 that supports concurrent sidelink and uplink transmission in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive a report indicating a capability of a UE to concurrently transmit over a sidelink channel and an uplink channel, transmit, based on the report, a transmission configuration scheduling a concurrent sidelink and uplink transmission within a resource shared by the sidelink channel and the uplink channel, and receive the concurrent sidelink and uplink transmission within the resource shared by the sidelink channel and the uplink channel based on the transmission configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting concurrent sidelink and uplink transmission).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
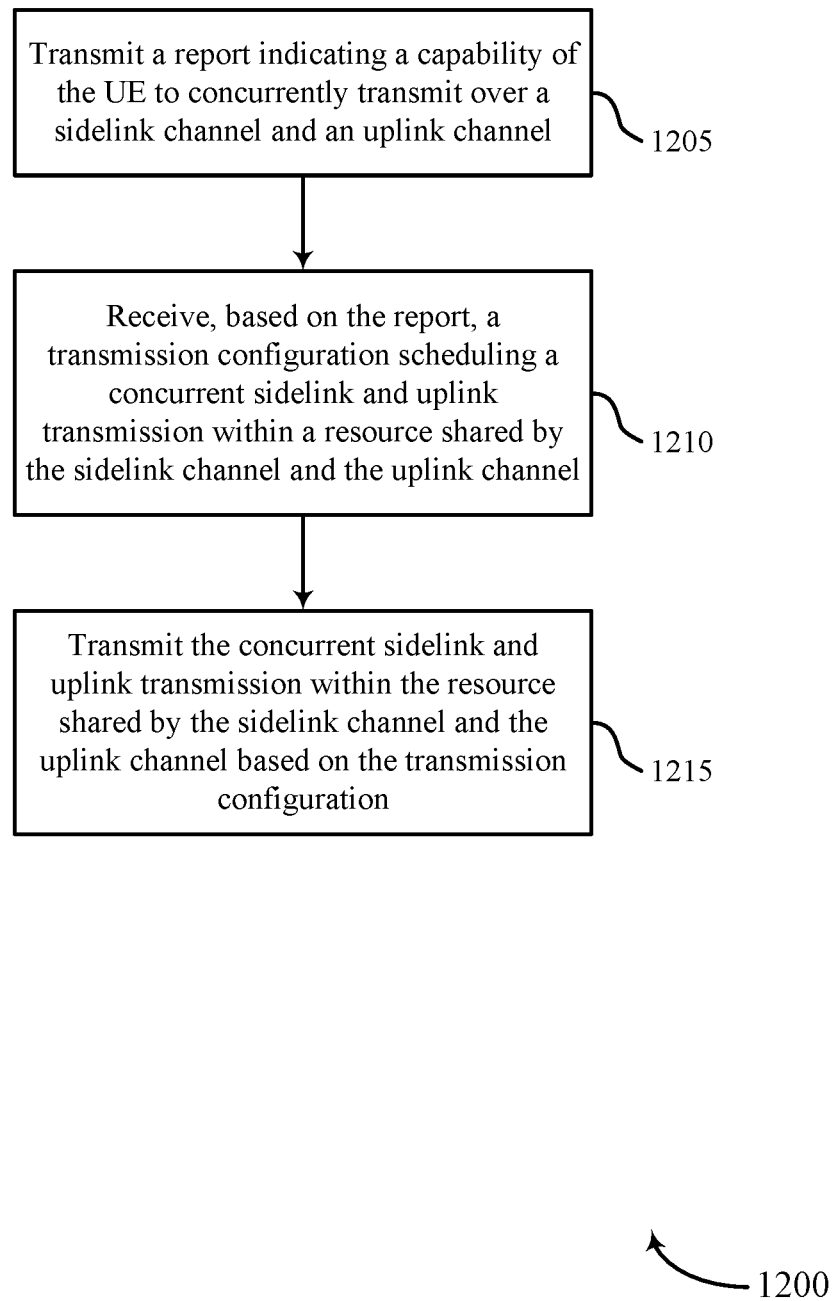
FIGS. 12 through 15 show flowcharts illustrating methods in accordance with aspects of the present disclosure.

FIG. 12 shows a flowchart illustrating a method 1200 that supports concurrent sidelink and uplink transmission in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit a report indicating a capability of the UE to concurrently transmit over a sidelink channel and an uplink channel. The operations of 1205 may be performed according to the methods described herein. In some examples, aspects of the operations of 1205 may be performed by a report component as described with reference to FIGS. 4 through 7.

At 1210, the UE may receive, based on the report, a transmission configuration scheduling a concurrent sidelink and uplink transmission within a resource shared by the sidelink channel and the uplink channel. The operations of 1210 may be performed according to the methods described herein. In some examples, aspects of the operations of 1210 may be performed by a configuration component as described with reference to FIGS. 4 through 7.

At 1215, the UE may transmit the concurrent sidelink and uplink transmission within the resource shared by the sidelink channel and the uplink channel based on the transmission configuration. The operations of 1215 may be performed according to the methods described herein. In some examples, aspects of the operations of 1215 may be performed by a concurrent transmission component as described with reference to FIGS. 4 through 7.

Figure 13:
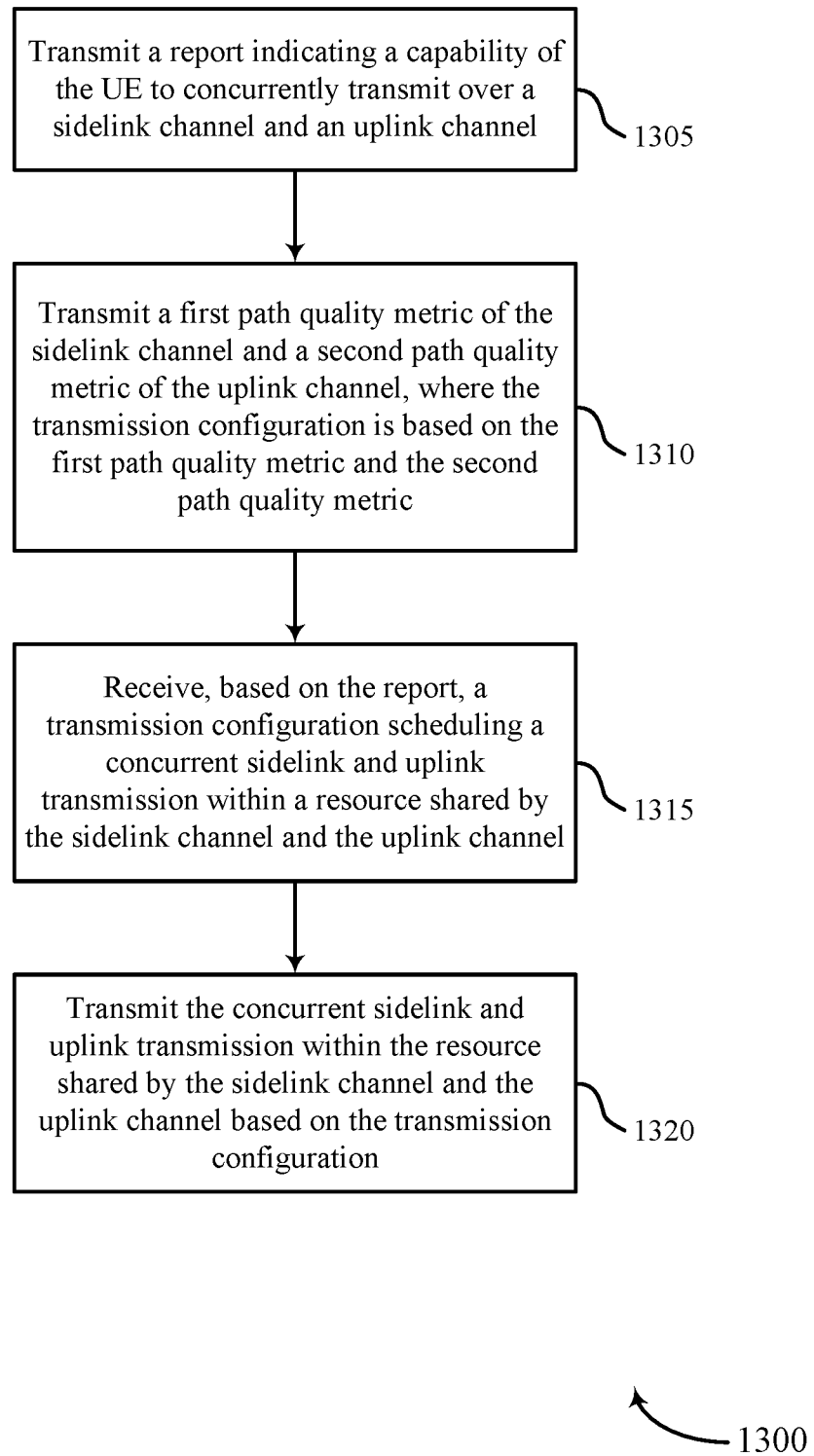

FIG. 13 shows a flowchart illustrating a method 1300 that supports concurrent sidelink and uplink transmission in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a report indicating a capability of the UE to concurrently transmit over a sidelink channel and an uplink channel. The operations of 1305 may be performed according to the methods described herein. In some examples, aspects of the operations of 1305 may be performed by a report component as described with reference to FIGS. 4 through 7.

At 1310, the UE may transmit a first path quality metric of the sidelink channel and a second path quality metric of the uplink channel, where the transmission configuration is based on the first path quality metric and the second path quality metric. The operations of 1310 may be performed according to the methods described herein. In some examples, aspects of the operations of 1310 may be performed by a quality component as described with reference to FIGS. 4 through 7.

At 1315, the UE may receive, based on the report, a transmission configuration scheduling a concurrent sidelink and uplink transmission within a resource shared by the sidelink channel and the uplink channel. The operations of 1315 may be performed according to the methods described herein. In some examples, aspects of the operations of 1315 may be performed by a configuration component as described with reference to FIGS. 4 through 7.

At 1320, the UE may transmit the concurrent sidelink and uplink transmission within the resource shared by the sidelink channel and the uplink channel based on the transmission configuration. The operations of 1320 may be performed according to the methods described herein. In some examples, aspects of the operations of 1320 may be performed by a concurrent transmission component as described with reference to FIGS. 4 through 7.

Figure 14:
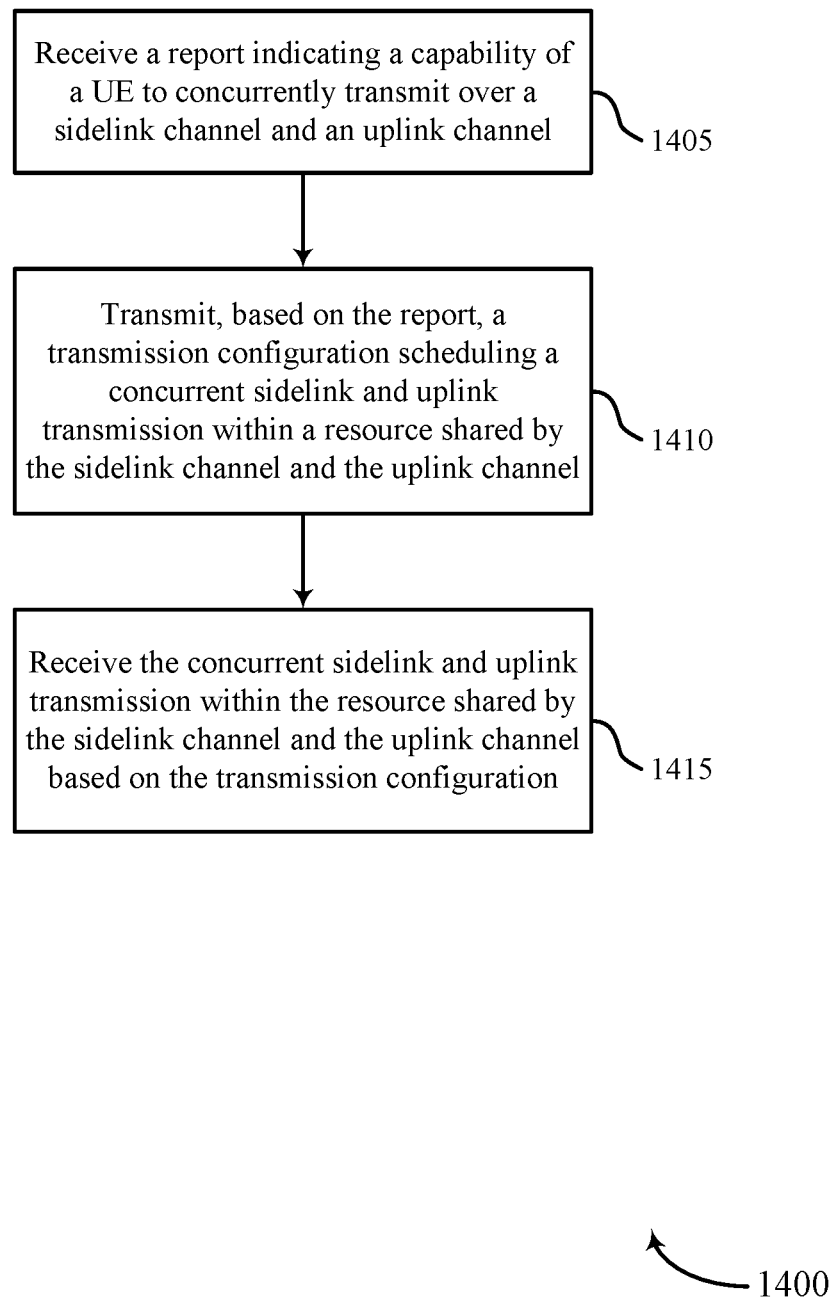

FIG. 14 shows a flowchart illustrating a method 1400 that supports concurrent sidelink and uplink transmission in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive a report indicating a capability of a UE to concurrently transmit over a sidelink channel and an uplink channel. The operations of 1405 may be performed according to the methods described herein. In some examples, aspects of the operations of 1405 may be performed by a report reception component as described with reference to FIGS. 8 through 11.

At 1410, the base station may transmit, based on the report, a transmission configuration scheduling a concurrent sidelink and uplink transmission within a resource shared by the sidelink channel and the uplink channel. The operations of 1410 may be performed according to the methods described herein. In some examples, aspects of the operations of 1410 may be performed by a configuration scheduling component as described with reference to FIGS. 8 through 11.

At 1415, the base station may receive the concurrent sidelink and uplink transmission within the resource shared by the sidelink channel and the uplink channel based on the transmission configuration. The operations of 1415 may be performed according to the methods described herein. In some examples, aspects of the operations of 1415 may be performed by a concurrent reception component as described with reference to FIGS. 8 through 11.

Figure 15:
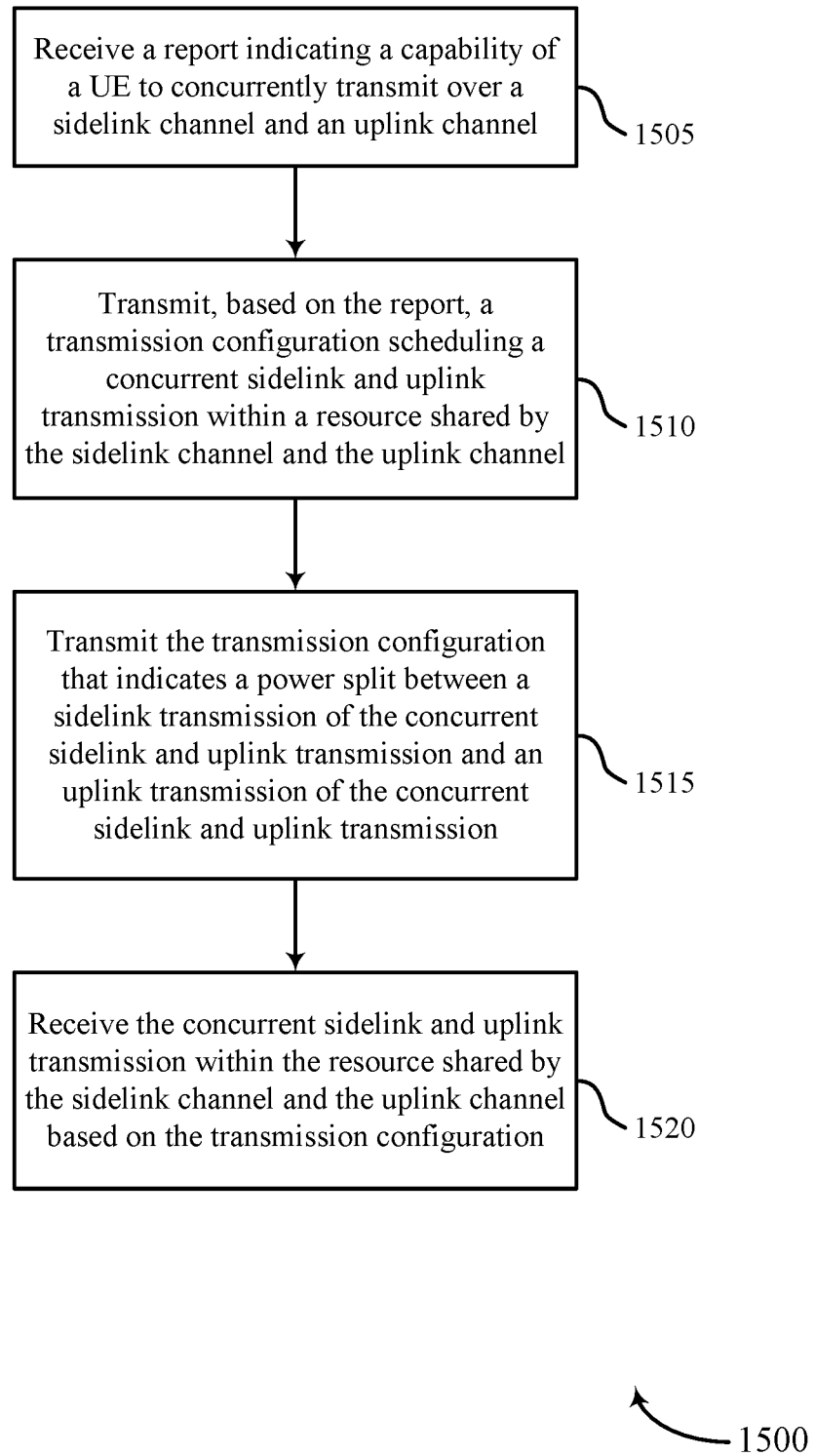

FIG. 15 shows a flowchart illustrating a method 1500 that supports concurrent sidelink and uplink transmission in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive a report indicating a capability of a UE to concurrently transmit over a sidelink channel and an uplink channel. The operations of 1505 may be performed according to the methods described herein. In some examples, aspects of the operations of 1505 may be performed by a report reception component as described with reference to FIGS. 8 through 11.

At 1510, the base station may transmit, based on the report, a transmission configuration scheduling a concurrent sidelink and uplink transmission within a resource shared by the sidelink channel and the uplink channel. The operations of 1510 may be performed according to the methods described herein. In some examples, aspects of the operations of 1510 may be performed by a configuration scheduling component as described with reference to FIGS. 8 through 11.

At 1515, the base station may transmit the transmission configuration that indicates a power split between a sidelink transmission of the concurrent sidelink and uplink transmission and an uplink transmission of the concurrent sidelink and uplink transmission. The operations of 1515 may be performed according to the methods described herein. In some examples, aspects of the operations of 1515 may be performed by a power parameter component as described with reference to FIGS. 8 through 11.

At 1520, the base station may receive the concurrent sidelink and uplink transmission within the resource shared by the sidelink channel and the uplink channel based on the transmission configuration. The operations of 1520 may be performed according to the methods described herein. In some examples, aspects of the operations of 1520 may be performed by a concurrent reception component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a UE, comprising: transmitting a report indicating a capability of the UE to concurrently transmit over a sidelink channel and an uplink channel; receiving, based at least in part on the report, a transmission configuration scheduling a concurrent sidelink and uplink transmission within a resource shared by the sidelink channel and the uplink channel; and transmitting the concurrent sidelink and uplink transmission within the resource shared by the sidelink channel and the uplink channel based at least in part on the transmission configuration.

Aspect 2: The method of aspect 1, wherein transmitting the report comprises: transmitting the report that includes an indication of intent to concurrently transmit over the sidelink channel and the uplink channel.

Aspect 3: The method of any of aspects 1 through 2, wherein transmitting the concurrent sidelink and uplink transmission comprises: transmitting the concurrent sidelink and uplink transmission based at least in part on a sidelink transmission encoded as a base layer of the concurrent sidelink and uplink transmission.

Aspect 4: The method of any of aspects 1 through 3, wherein transmitting the concurrent sidelink and uplink transmission comprises: transmitting the concurrent sidelink and uplink transmission based at least in part on an uplink transmission encoded as an enhancement layer of the concurrent sidelink and uplink transmission.

Aspect 5: The method of any of aspects 1 through 4, further comprising: transmitting a first path quality metric of the sidelink channel and a second path quality metric of the uplink channel, wherein the transmission configuration is based at least in part on the first path quality metric and the second path quality metric.

Aspect 6: The method of aspect 5, wherein each of the first path quality metric and the second path quality metric is a path loss metric.

Aspect 7: The method of any of aspects 1 through 6, further comprising: transmitting a sidelink resource request, wherein the transmission configuration is received based at least in part on the sidelink resource request.

Aspect 8: The method of any of aspects 1 through 7, further comprising: transmitting an uplink resource request, wherein the transmission configuration is received based at least in part on the uplink resource request.

Aspect 9: The method of any of aspects 1 through 8, wherein receiving the transmission configuration comprises: receiving the transmission configuration that includes a resource assignment that indicates the resource.

Aspect 10: The method of any of aspects 1 through 9, wherein receiving the transmission configuration comprises: receiving the transmission configuration that indicates a grant for scheduling the concurrent sidelink and uplink transmission.

Aspect 11: The method of any of aspects 1 through 10, wherein receiving the transmission configuration comprises: receiving the transmission configuration that indicates a first transmission parameter for a sidelink transmission of the concurrent sidelink and uplink transmission and a second transmission parameter for an uplink transmission of the concurrent sidelink and uplink transmission, or both.

Aspect 12: The method of aspect 11, wherein the first transmission parameter is a first modulation and coding scheme for the sidelink transmission, the second transmission parameter is a second modulation and coding scheme for the uplink transmission, or both.

Aspect 13: The method of any of aspects 1 through 12, wherein receiving the transmission configuration comprises: receiving the transmission configuration that indicates a power split between a sidelink transmission of the concurrent sidelink and uplink transmission and an uplink transmission of the concurrent sidelink and uplink transmission.

Aspect 14: The method of aspect 13, wherein receiving the transmission configuration comprises: receiving the transmission configuration that indicates a power control parameter for the concurrent sidelink and uplink transmission.

Aspect 15: The method of aspect 14, wherein transmitting the concurrent sidelink and uplink transmission comprises: transmitting the concurrent sidelink and uplink transmission in accordance with the power split and a power budget determined based at least in part on the power control parameter.

Aspect 16: A method for wireless communications by a base station, comprising: receiving a report indicating a capability of a UE to concurrently transmit over a sidelink channel and an uplink channel; transmitting, based at least in part on the report, a transmission configuration scheduling a concurrent sidelink and uplink transmission within a resource shared by the sidelink channel and the uplink channel; and receiving the concurrent sidelink and uplink transmission within the resource shared by the sidelink channel and the uplink channel based at least in part on the transmission configuration.

Aspect 17: The method of aspect 16, wherein receiving the report comprises: receiving the report that includes an indication of intent to concurrently transmit over the sidelink channel and the uplink channel.

Aspect 18: The method of any of aspects 16 through 17, wherein receiving the concurrent sidelink and uplink transmission comprises: receiving the concurrent sidelink and uplink transmission based at least in part on a sidelink transmission encoded as a base layer of the concurrent sidelink and uplink transmission.

Aspect 19: The method of any of aspects 16 through 18, wherein receiving the concurrent sidelink and uplink transmission comprises: receiving the concurrent sidelink and uplink transmission based at least in part on an uplink transmission encoded as an enhancement layer of the concurrent sidelink and uplink transmission.

Aspect 20: The method of aspect 19, further comprising: decoding the concurrent sidelink and uplink transmission based at least in part on the transmission configuration and cancelling a sidelink transmission encoded as a base layer of the concurrent sidelink and uplink transmission.

Aspect 21: The method of any of aspects 16 through 20, further comprising: receiving a first path quality metric of the sidelink channel and a second path quality metric of the uplink channel, wherein the transmission configuration is based at least in part on the first path quality metric and the second path quality metric.

Aspect 22: The method of any of aspects 16 through 21, further comprising: receiving a sidelink resource request, wherein the transmission configuration is received based at least in part on the sidelink resource request.

Aspect 23: The method of any of aspects 16 through 22, further comprising: receiving an uplink resource request, wherein the transmission configuration is received based at least in part on the uplink resource request.

Aspect 24: The method of any of aspects 16 through 23, wherein transmitting the transmission configuration comprises: transmitting the transmission configuration that includes a resource assignment that indicates the resource.

Aspect 25: The method of any of aspects 16 through 24, wherein transmitting the transmission configuration comprises: transmitting the transmission configuration that indicates a grant for scheduling the concurrent sidelink and uplink transmission.

Aspect 26: The method of any of aspects 16 through 25, wherein transmitting the transmission configuration comprises: transmitting the transmission configuration that indicates a first transmission parameter for a sidelink transmission of the concurrent sidelink and uplink transmission and a second transmission parameter for an uplink transmission of the concurrent sidelink and uplink transmission, or both.

Aspect 27: The method of any of aspects 16 through 26, wherein transmitting the transmission configuration comprises: transmitting the transmission configuration that indicates a power split between a sidelink transmission of the concurrent sidelink and uplink transmission and an uplink transmission of the concurrent sidelink and uplink transmission.

Aspect 28: The method of aspect 27, wherein transmitting the transmission configuration comprises: transmitting the transmission configuration that indicates a power control parameter for the concurrent sidelink and uplink transmission; and receiving the concurrent sidelink and uplink transmission in accordance with the power split and a power budget determined based at least in part on the power control parameter.

Aspect 29: An apparatus for wireless communications by a UE, comprising a processor; memory coupled with the processor; and instructions stored in the memory and executable by the processor to cause the apparatus to perform a method of any of aspects 1 through 15.

Aspect 30: An apparatus for wireless communications by a UE, comprising at least one means for performing a method of any of aspects 1 through 15.

Aspect 31: A non-transitory computer-readable medium storing code for wireless communications by a UE, the code comprising instructions executable by a processor to perform a method of any of aspects 1 through 15.

Aspect 32: An apparatus for wireless communications by a base station, comprising a processor; memory coupled with the processor; and instructions stored in the memory and executable by the processor to cause the apparatus to perform a method of any of aspects 16 through 28.

Aspect 33: An apparatus for wireless communications by a base station, comprising at least one means for performing a method of any of aspects 16 through 28.

Aspect 34: A non-transitory computer-readable medium storing code for wireless communications by a base station, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   transmitting a report indicating a capability of the UE to concurrently transmit over a sidelink channel and an uplink channel;
   receiving, based at least in part on the report, a transmission configuration scheduling a concurrent sidelink and uplink transmission within a resource shared by the sidelink channel and the uplink channel that at least partially overlap in frequency, the transmission configuration indicating a first transmission parameter for a sidelink transmission of the concurrent sidelink and uplink transmission and a second transmission parameter for an uplink transmission of the concurrent sidelink and uplink transmission; and transmitting the concurrent sidelink and uplink transmission within the resource shared by the sidelink channel and the uplink channel based at least in part on the transmission configuration, wherein the sidelink transmission is encoded as a base layer of the concurrent sidelink and uplink transmission and the uplink transmission is encoded as an enhancement layer of the concurrent sidelink and uplink transmission, and wherein the base layer and the enhancement layer are superimposed in the concurrent sidelink and uplink transmission.

2. The method of claim 1, wherein transmitting the report comprises:

transmitting the report that includes an indication of intent to concurrently transmit over the sidelink channel and the uplink channel.

3. The method of claim 1, further comprising:

transmitting a first path quality metric of the sidelink channel and a second path quality metric of the uplink channel, wherein the transmission configuration is based at least in part on the first path quality metric and the second path quality metric.

4. The method of claim 3, wherein each of the first path quality metric and the second path quality metric is a path loss metric.

5. The method of claim 1, further comprising:

transmitting a sidelink resource request, wherein the transmission configuration is received based at least in part on the sidelink resource request.

6. The method of claim 1, further comprising:

transmitting an uplink resource request, wherein the transmission configuration is received based at least in part on the uplink resource request.

7. The method of claim 1, wherein receiving the transmission configuration comprises:

receiving the transmission configuration that includes a resource assignment that indicates the resource.

8. The method of claim 1, wherein receiving the transmission configuration comprises:

receiving the transmission configuration that indicates a grant for scheduling the concurrent sidelink and uplink transmission.

9. The method of claim 1, wherein the first transmission parameter is a first modulation and coding scheme for the sidelink transmission, the second transmission parameter is a second modulation and coding scheme for the uplink transmission.

10. The method of claim 1, wherein receiving the transmission configuration comprises:

receiving the transmission configuration that indicates a power split between the sidelink transmission of the concurrent sidelink and uplink transmission and the uplink transmission of the concurrent sidelink and uplink transmission.

11. The method of claim 10, wherein receiving the transmission configuration comprises:

receiving the transmission configuration that indicates a power control parameter for the concurrent sidelink and uplink transmission.

12. The method of claim 11, wherein transmitting the concurrent sidelink and uplink transmission comprises:

transmitting the concurrent sidelink and uplink transmission in accordance with the power split and a power budget determined based at least in part on the power control parameter.

13. A method for wireless communications by a network device, comprising:

receiving a report indicating a capability of a user equipment (UE) to concurrently transmit over a sidelink channel and an uplink channel;

transmitting, based at least in part on the report, a transmission configuration scheduling a concurrent sidelink and uplink transmission within a resource shared by the sidelink channel and the uplink channel that at least partially overlap in frequency, the transmission configuration indicating a first transmission parameter for a sidelink transmission of the concurrent sidelink and uplink transmission and a second transmission parameter for an uplink transmission of the concurrent sidelink and uplink transmission; and receiving the concurrent sidelink and uplink transmission within the resource shared by the sidelink channel and the uplink channel based at least in part on the transmission configuration, wherein the sidelink transmission is encoded as a base layer of the concurrent sidelink and uplink transmission and the uplink transmission is encoded as an enhancement layer of the concurrent sidelink and uplink transmission, and wherein the base layer and the enhancement layer are superimposed in the concurrent sidelink and uplink transmission.

14. The method of claim 13, wherein receiving the report comprises:

receiving the report that includes an indication of intent to concurrently transmit over the sidelink channel and the uplink channel.

15. The method of claim 13, further comprising:

decoding the concurrent sidelink and uplink transmission based at least in part on the transmission configuration; and cancelling the sidelink transmission encoded as the base layer of the concurrent sidelink and uplink transmission.

16. The method of claim 13, further comprising:

receiving a first path quality metric of the sidelink channel and a second path quality metric of the uplink channel, wherein the transmission configuration is based at least in part on the first path quality metric and the second path quality metric.

17. The method of claim 13, further comprising:

receiving a sidelink resource request, wherein the transmission configuration is received based at least in part on the sidelink resource request.

18. The method of claim 13, further comprising:

receiving an uplink resource request, wherein the transmission configuration is received based at least in part on the uplink resource request.

19. The method of claim 13, wherein transmitting the transmission configuration comprises:

transmitting the transmission configuration that includes a resource assignment that indicates the resource.

20. The method of claim 13, wherein transmitting the transmission configuration comprises:

transmitting the transmission configuration that indicates a grant for scheduling the concurrent sidelink and uplink transmission.

21. The method of claim 13, wherein transmitting the transmission configuration comprises:

transmitting the transmission configuration that indicates a power split between the sidelink transmission of the concurrent sidelink and uplink transmission and the uplink transmission of the concurrent sidelink and uplink transmission.

22. The method of claim 21, wherein transmitting the transmission configuration comprises:
   transmitting the transmission configuration that indicates a power control parameter for the concurrent sidelink and uplink transmission; and
   receiving the concurrent sidelink and uplink transmission in accordance with the power split and a power budget determined based at least in part on the power control parameter.

23. A user equipment (UE) for wireless communications, comprising:
   one or more processors; and
   memory coupled to the one or more processors, the one or more processors configured individually or collectively to cause the UE to:
      transmit a report indicating a capability of the UE to concurrently transmit over a sidelink channel and an uplink channel;
      receive, based at least in part on the report, a transmission configuration scheduling a concurrent sidelink and uplink transmission within a resource shared by the sidelink channel and the uplink channel that at least partially overlap in frequency, the transmission configuration indicating a first transmission parameter for a sidelink transmission of the concurrent sidelink and uplink transmission and a second transmission parameter for an uplink transmission of the concurrent sidelink and uplink transmission; and
      transmit the concurrent sidelink and uplink transmission within the resource shared by the sidelink channel and the uplink channel based at least in part on the transmission configuration, wherein the sidelink transmission is encoded as a base layer of the concurrent sidelink and uplink transmission and the uplink transmission is encoded as an enhancement layer of the concurrent sidelink and uplink transmission, and wherein the base layer and the enhancement layer are superimposed in the concurrent sidelink and uplink transmission.

24. The UE of claim 23, wherein the report includes an indication of intent to concurrently transmit over the sidelink channel and the uplink channel.

25. The UE of claim 23, wherein the one or more processors are further configured individually or collectively to cause the UE to:
   transmit a first path quality metric of the sidelink channel and a second path quality metric of the uplink channel, wherein the transmission configuration is based at least in part on the first path quality metric and the second path quality metric, and wherein each of the first path quality metric and the second path quality metric is a path loss metric.

26. The UE of claim 23, wherein the transmission configuration indicates:
   a power split between the sidelink transmission of the concurrent sidelink and uplink transmission and the uplink transmission of the concurrent sidelink and uplink transmission, and
   a power control parameter for the concurrent sidelink and uplink transmission, and
   wherein, to transmit the concurrent sidelink and uplink transmission, the one or more processors are configured individually or collectively to cause the UE to:
      transmit the concurrent sidelink and uplink transmission in accordance with the power split and a power budget determined based at least in part on the power control parameter.

27. A network device for wireless communications, comprising:
   one or more processors; and
   memory coupled to the one or more processors, the one or more processors configured individually or collectively to cause the network device to:
      receive a report indicating a capability of a user equipment (UE) to concurrently transmit over a sidelink channel and an uplink channel;
      transmit, based at least in part on the report, a transmission configuration scheduling a concurrent sidelink and uplink transmission within a resource shared by the sidelink channel and the uplink channel that at least partially overlap in frequency, the transmission configuration indicating a first transmission parameter for a sidelink transmission of the concurrent sidelink and uplink transmission and a second transmission parameter for an uplink transmission of the concurrent sidelink and uplink transmission; and
      receive the concurrent sidelink and uplink transmission within the resource shared by the sidelink channel and the uplink channel based at least in part on the transmission configuration, wherein the sidelink transmission is encoded as a base layer of the concurrent sidelink and uplink transmission and the uplink transmission is encoded as an enhancement layer of the concurrent sidelink and uplink transmission, and wherein the base layer and the enhancement layer are superimposed in the concurrent sidelink and uplink transmission.

28. The network device of claim 27, wherein the report includes an indication of intent to concurrently transmit over the sidelink channel and the uplink channel.

29. The network device of claim 27, wherein the one or more processors are further configured individually or collectively to cause the network device to:
   decode the concurrent sidelink and uplink transmission based at least in part on the transmission configuration; and
   cancel the sidelink transmission encoded as the base layer of the concurrent sidelink and uplink transmission.

30. The network device of claim 27, wherein the one or more processors are further configured individually or collectively to cause the network device to:
   receive a first path quality metric of the sidelink channel and a second path quality metric of the uplink channel, wherein the transmission configuration is based at least in part on the first path quality metric and the second path quality metric.

* * * * *